US010005682B1

(12) United States Patent
Hengsperger et al.

(10) Patent No.: US 10,005,682 B1
(45) Date of Patent: Jun. 26, 2018

(54) HOLDING TANK-LESS WATER OZONATING SYSTEM

(71) Applicant: TERSANO INC., Oldcastle (CA)

(72) Inventors: Steve L. Hengsperger, Tecumseh (CA); Justin L. Namespetra, Essex (CA); James E. O'Neil, Woodslee (CA)

(73) Assignee: Tersano Inc., Oldcastle (CA)

( * ) Notice: Subject to any disclaimer, the term of this patent is extended or adjusted under 35 U.S.C. 154(b) by 632 days.

(21) Appl. No.: 14/552,359

(22) Filed: Nov. 24, 2014

Related U.S. Application Data

(63) Continuation-in-part of application No. 13/499,825, filed as application No. PCT/CA2010/001520 on Sep. 30, 2010, now Pat. No. 8,894,750.
(Continued)

(51) Int. Cl.
*B01F 3/00* (2006.01)
*C02F 1/78* (2006.01)
(Continued)

(52) U.S. Cl.
CPC ............ *C02F 1/78* (2013.01); *B01F 3/04503* (2013.01); *B01F 3/04985* (2013.01); *C02F 1/20* (2013.01);
(Continued)

(58) Field of Classification Search
CPC .......... C02F 1/78; C02F 1/20; C02F 2209/44; C02F 2303/04; B01F 3/04503; B01F 3/04985
(Continued)

(56) References Cited

U.S. PATENT DOCUMENTS 4,043,913 A    8/1977    Hintermeister
4,427,426 A    1/1984    Johnson et al.
(Continued)

FOREIGN PATENT DOCUMENTS

CA      2355769 A1    6/2000
EP      0069537 A2    1/1983
(Continued)

OTHER PUBLICATIONS

Supplementary European Search Report and Opinion dated Oct. 1, 2013 for corresponding European Patent Application No. 10819768.2.
(Continued)

*Primary Examiner* — T. Bennett McKenzie
(74) *Attorney, Agent, or Firm* — Borden Ladner Gervais LLP

(57) ABSTRACT

A system is described herein which provides an ozonated liquid. The system comprises a liquid inlet arranged to continuously accept a liquid into the system at a desired flow rate; a liquid outlet to dispense ozonated liquid out of the system, the ozonated liquid having an oxidation-reduction potential of at least 450 mV due solely to ozone dissolved in the liquid, the liquid outlet being in fluid communication with the liquid inlet and arranged to dispense the ozonated liquid out of the system at the desired flow rate. The system has a tank-less ozonation flow path between the liquid inlet and the liquid outlet, the flow path adapted to ozonate the accepted liquid, producing the ozonated liquid to be dispensed out of the system. The accepted liquid has a fluid residence time in the ozonation flow path of less than 5 minutes prior to being dispensed as the ozonated liquid.

17 Claims, 16 Drawing Sheets

Related U.S. Application Data

(60) Provisional application No. 61/248,075, filed on Oct. 2, 2009, provisional application No. 61/248,055, filed on Oct. 2, 2009, provisional application No. 61/248,102, filed on Oct. 2, 2009.

(51) Int. Cl.
*B01F 3/04* (2006.01)
*C02F 1/20* (2006.01)

(52) U.S. Cl.
CPC ...... *C02F 2209/44* (2013.01); *C02F 2303/04* (2013.01)

(58) Field of Classification Search
USPC .......................................................... 95/261
See application file for complete search history.

(56) References Cited

U.S. PATENT DOCUMENTS

| | | |
|---|---|---|
| 4,619,763 A | 10/1986 | O'Brien |
| 4,752,740 A | 6/1988 | Steininger |
| 5,218,304 A | 6/1993 | Kinlen et al. |
| 5,250,177 A | 10/1993 | Cho |
| 5,326,444 A | 7/1994 | Nakamatsu et al. |
| 5,343,302 A | 8/1994 | Yamashita |
| 5,385,711 A | 1/1995 | Baker et al. |
| 5,407,550 A | 4/1995 | Shimamune et al. |
| 5,431,861 A | 7/1995 | Nagahiro et al. |
| 5,433,866 A | 7/1995 | Hoppe et al. |
| 5,494,576 A | 2/1996 | Hoppe et al. |
| 5,674,312 A | 10/1997 | Mazzei |
| 5,851,407 A | 12/1998 | Bowman et al. |
| 5,900,127 A | 5/1999 | Iida et al. |
| 5,989,407 A | 11/1999 | Andrews et al. |
| 6,053,967 A | 4/2000 | Heilmann et al. |
| 6,054,046 A | 4/2000 | Nelson |
| 6,088,543 A | 7/2000 | Kaji et al. |
| 6,123,839 A | 9/2000 | Sussman |
| 6,132,629 A | 10/2000 | Boley |
| 6,193,893 B1 | 2/2001 | Mazzei et al. |
| 6,287,431 B1 | 9/2001 | Murphy et al. |
| 6,340,431 B2 | 1/2002 | Khan |
| 6,419,831 B2 | 7/2002 | Wang |
| 6,491,811 B2 | 12/2002 | Conrad et al. |
| 6,670,988 B1 | 12/2003 | Gallagher et al. |
| 6,723,233 B1 | 4/2004 | Barnes |
| 6,866,703 B2 | 3/2005 | Mazzei |
| 6,926,819 B2 | 8/2005 | Nakamura et al. |
| 6,964,739 B2 | 11/2005 | Boyd et al. |
| 7,151,560 B2 | 12/2006 | Matherson et al. |
| 7,212,239 B2 | 5/2007 | Sakaguchi |
| 7,391,450 B2 | 6/2008 | Pinto et al. |
| 7,550,746 B2 | 6/2009 | Tokhtuev et al. |
| 7,652,267 B2 | 1/2010 | Tokhtuev et al. |
| 7,655,078 B2 | 2/2010 | Saito et al. |
| 7,702,235 B2 | 4/2010 | Drader et al. |
| 8,894,750 B2 | 11/2014 | Hengsperger et al. |
| 2002/0060189 A1 | 5/2002 | Conrad |
| 2002/0070123 A1 | 6/2002 | Andrews et al. |
| 2003/0007707 A1 | 1/2003 | Gallagher |
| 2003/0044066 A1 | 3/2003 | Sakaguchi |
| 2003/0234864 A1 | 12/2003 | Matherson et al. |
| 2004/0041919 A1 | 3/2004 | Yamanaka |
| 2004/0144256 A1 | 7/2004 | Mazzei |
| 2004/0204892 A1 | 10/2004 | Sweet |
| 2004/0257454 A1 | 12/2004 | Pinto et al. |
| 2005/0017380 A1 | 1/2005 | Namespetra et al. |
| 2005/0249631 A1 | 11/2005 | Schulz et al. |
| 2006/0027463 A1 | 2/2006 | Lavelle et al. |
| 2006/0098240 A1 | 5/2006 | Funamoto |
| 2006/0098403 A1 | 5/2006 | Smith |
| 2006/0243673 A1 | 11/2006 | Van Leeuwen et al. |
| 2006/0254987 A1 | 11/2006 | Burns et al. |
| 2007/0023273 A1 | 2/2007 | Kitaori et al. |
| 2007/0034890 A1 | 2/2007 | Daschner et al. |
| 2007/0186367 A1 | 8/2007 | Field et al. |
| 2007/0186368 A1 | 8/2007 | Field et al. |
| 2007/0186369 A1 | 8/2007 | Field et al. |
| 2007/0186954 A1 | 8/2007 | Field et al. |
| 2007/0186957 A1 | 8/2007 | Field et al. |
| 2007/0186958 A1 | 8/2007 | Field et al. |
| 2007/0187261 A1 | 8/2007 | Field et al. |
| 2007/0187262 A1 | 8/2007 | Field et al. |
| 2007/0187263 A1 | 8/2007 | Field et al. |
| 2007/0212594 A1 | 9/2007 | Takasu et al. |
| 2008/0067078 A1 | 3/2008 | Kitaori et al. |
| 2008/0190825 A1 | 8/2008 | Hengsperger et al. |
| 2008/0210572 A1 | 9/2008 | Field |
| 2008/0302726 A1 | 12/2008 | Moller et al. |
| 2008/0314762 A1 | 12/2008 | Jones et al. |
| 2009/0072052 A1 | 3/2009 | Gillette |
| 2009/0282629 A1 | 11/2009 | Arrington |
| 2009/0314651 A1 | 12/2009 | Field |
| 2009/0314654 A1 | 12/2009 | Field |
| 2009/0314655 A1 | 12/2009 | Field |
| 2009/0314657 A1 | 12/2009 | Field |
| 2009/0314658 A1 | 12/2009 | Field |
| 2010/0147690 A1* | 6/2010 | Audunson ........... B01F 3/04985 204/557 |

FOREIGN PATENT DOCUMENTS

| | | |
|---|---|---|
| EP | 0915060 A1 | 5/1999 |
| EP | 1045573 A2 | 10/2000 |
| EP | 1859675 A1 | 11/2007 |
| JP | 2003283922 A | 10/2003 |
| WO | 01/72432 A1 | 10/2001 |
| WO | 2004063100 A2 | 7/2004 |
| WO | 2004/113232 A2 | 12/2004 |
| WO | 2006/096990 A1 | 9/2006 |
| WO | 2009/117141 A1 | 9/2009 |

OTHER PUBLICATIONS

Printout of "Tersano (International) SRL, 'Lotus Sanitizing System" retrieved on May 7, 2010, from http://www.tersano.com, 28 pages.
Del Ozone, "Mobile Ozone Surface Sanitation System", AGW-0500 Owner's Manual, 20 pages, published at least as early as Oct. 14, 2003.
"Oxidation Reduction Potential (ORP): A New Tool for Evaluating Water Sanitation", Hybrid, a Hendrix Genetics Company, Info Sheet, pp. 1-4.
Suslow, "Using Oxidation Reduction Potential (ORP) for Water Disinfection Monitoring, Control and Documentation", Program (USDA CSREES Agreement# 99-41560-0821), University of California, pp. 1-5.
Mazzei et al., "High Efficiency In-Line Pressurized Ozone Contacting With the GDT™ Process", International Ozone Association European African Group, 1997 Annual Conference, Berlin, Germany, Apr. 22, 1997, pp. 1-17.
Mazzei, "Ozone Contacting with Mazzei® GDT™ Technology", Mazzei Injector Company LLC, http://www.mazzei.net/applications/ozone/ozone_syst.htrn, pp. 1-3 published at least as early as Sep. 23, 2009.
Ozone Solutions, "Ozone System Diagram", http://www.ozonesolutions.com/waterzone-4-ei3.html, 1 page, published at least as early as Sep. 17, 2009.
European Patent Application No. 11837376.0, Extended Search Report dated Oct. 24, 2014.
U.S. Appl. No. 13/499,825, Office Action dated Mar. 28, 2014.
International Patent Application No. PCT/CA2011/050684, International Search Report dated Jan. 10, 2012.
International Patent Application No. PCT/CA2011/050684, International Preliminary Report on Patentability dated May 7, 2013.
International Patent Application No. PCT/CA2010/001520, International Search Report dated Jan. 7, 2011.
International Patent Application No. PCT/CA2010/001520, International Preliminary Report on Patentability dated Apr. 12, 2012.
U.S. Appl. No. 13/879,914, Office Action dated Mar. 18, 2015.

(56) References Cited

OTHER PUBLICATIONS

European Patent Application No. 07101201, European Search Report dated Apr. 27, 2007.
European Patent Application No. 10819768.2, Examination Report dated Apr. 21, 2017.
European Patent Application No. 118373760, Office Action dated Jan. 31, 2017.
U.S. Appl. No. 11/626,994, Notice of Allowance dated Dec. 3, 2009.
U.S. Appl. No. 12/724,717, Notice of Allowance dated May 17, 2011.
U.S. Appl. No. 13/187,578, Notice of Allowance dated Aug. 3, 2012.
Written Opinion for Application No. PCT/CA2011/050684, dated Jan. 10, 2012 6 pages.
European Patent Application No. 11837376.0, Office Action dated Jan. 31, 2017.
European Patent Application No. 10819768.2, Intention to grant dated Oct. 17, 2017.

* cited by examiner

HOLDING TANK-LESS WATER OZONATING SYSTEM

CROSS REFERENCE

The present application is a continuation-in-part of U.S. patent application Ser. No. 13/499,825, which is a national entry of PCT Application Serial No. CA2010/001520, which claims the benefit of: U.S. Provisional Application 61/248,102 (filed Oct. 2, 2009); U.S. Provisional Application 61/248,075 (filed Oct. 2, 2009); and U.S. Provisional 61/248,055 (filed Oct. 2, 2009).

FIELD OF THE INVENTION

The present application relates generally to devices, and related methods, that provide ozonated liquid. More particularly, the present application relates to tank-less devices, and related methods, that provide ozonated liquid on demand.

BACKGROUND OF THE INVENTION

Ozone is a naturally occurring allotrope of oxygen. It has been known and used as an oxidant and disinfectant. In aqueous solutions, ozone is capable of killing bacteria in seconds at appropriate concentrations. It is often desirable to use ozone as a disinfecting or sanitizing agent as it imparts no odor and leaves no residue. The sanitizing properties of ozone dissolved in water, as well as its lack of odor and residue, make such a solution desirable to use for cleaning and disinfecting. Ozonated water can be used to disinfect or sanitize in both commercial and home settings. For example, ozonated water can be used to disinfect or sanitize bathroom counters, produce, dishes and cutlery, or floors.

One convenient method for using ozone as a disinfectant or sanitizer is to dissolve it in water or a water based solution. The stability of ozone is often a complicating factor in its use as a disinfecting or sanitizing agent since the high reactivity of ozone, which imparts its disinfecting and sanitizing properties, also results in reaction with reducing agents and, therefore, decomposition. In light of the poor stability of ozone, however, one difficulty is the delivery of ozonated water in an "on demand" basis. Ozone in ozonated water, produced in anticipation of demand, will eventually decompose and return to being non-ozonated water.

Known ozonation systems for producing ozonated water suitable for cleaning, disinfecting or sanitizing are designed with a tank of water and a recirculating ozonating flow path. The water flows through the ozonating flow path and dissolves an amount of ozone therein. Low efficiency in the ozonating flow path results in the need to recirculate the ozonated water back through the ozonation flow path in order to achieve the desired amount of dissolved ozone. This is typically achieved by recirculating the ozonated water back into the tank of water and running the ozonation system for a period of time until all the water in the tank is sufficiently ozonated.

Known ozonation systems have addressed the delay between (a) starting the system and (b) delivery of ozonated water having a usable level of ozone, by increasing the efficiency of the ozonating flow path and/or by using a continuously recirculating system.

It is possible to produce ozonated water "on demand" using a continuously recirculating system. Continuously recirculating systems have an ozonation flow path that recirculates ozonated water back to the holding tank, and the system ozonates the water in the system regardless of whether ozonated water is being dispensed. In such systems, ozone is continuously added to the water to replace any ozone that has decomposed, or to ozonate any fresh water that has been added to replace ozonated water removed from the system. A steady-state of ozonated water is eventually reached based on the inlet and outlet flow rates, as well as the efficiency of the ozonation flow path. However, at the start of ozonation, the level of dissolved ozone is low and gradually increases until the steady-state is achieved.

There are a number of disadvantages with continuously recirculating systems. For example: they require energy to produce the constantly required ozone; ozone is corrosive with some materials; and there may be a fluctuation in the level of dissolved ozone if a significant amount of ozonated water is removed from the tank.

In traditional ozonation systems, both continuously and non-continuously recirculating systems, there is a delay between the start of the ozonation and the delivery of the ozonated water. A user must wait for the tank of water to be ozonated before the ozonated water can be used. In recirculating systems, starting the ozonation system and removing water from the tank before the ozonation is finished results in non-ozonated water or water with a low level of ozone dissolved therein. In continuously recirculating systems, a user must still wait for the level of ozonation in the water to increase to a usable level. During this time, the continuously recirculating system is either discharging water with low levels of ozone dissolved therein or not discharging water at all.

It is therefore desirable to provide an ozonation system that can dispense ozonated water "on demand" without the need for a continuously recirculating system, (i.e. an ozonation system that dispenses ozone via a single pass through the ozonating flow path) thereby doing away with the need for a holding tank.

Some ozonation systems use devices to separate, for example, water from undissolved ozone gas. Such devices are generally known as "off-gas" units, "degassing" units, or "gas-liquid" separators. All such devices take, as an input stream, a mixture of gas and liquid and provide, as separate output streams, a degassed liquid and a separated gas. The degassed liquid can have gas dissolved therein, even though bubbles of gas have been removed. Depending on the desired outlet stream, an off-gas unit can be used to produce, for example, a humidified gas stream, a gas-enriched liquid stream, or a completely degassed liquid.

Under conditions where the flow rate of a liquid is not crucial, the liquid can be degassed simply by letting the liquid and gas naturally separate due to differences in density between the liquid and gas. This process can be accelerated by placing the gas-liquid mixture under an external vacuum. In this situation, the reduced solubility of the gas is caused by the external vacuum, which encourages the gas to separate from the liquid in order to fill the vacuum.

Some known system use centrifugal separation to encourage the separation of gas from a gas-liquid mixture. In such systems, the degassing is achieved by the centrifugal forces on a liquid having a vortex flow. The centrifugal flow of liquid results in pressure differences in the liquid as a function of distance from the center axis of rotation. The low density gas and gas-liquid mixture are collected in the low pressure zone along the center of rotation, while the high density liquid is collected in the high pressure zone around the perimeter of rotation.

Increasing the flow rate in a given size of gas-liquid separator increases the centrifugal force in the vortex flow, resulting in a lower pressure in the low pressure zone and a higher pressure in the high pressure zone. This increase in centrifugal force hastens the separation of gas from the liquid. However, higher flow rates also lead to increased turbulence in the liquid flow as well as a lower residence time in the gas-liquid separator. This increased turbulence and lower residence time discourage separation of gas from liquid and lead to bubbles entering the degassed liquid output stream.

It is desirable to provide an off-gas unit that can separate a gas-liquid mixture into a degassed liquid and a separated gas at a high flow rate.

As discussed above, ozonated water can be used to sanitize items and surfaces, and is an effective replacement to chemical cleaners. Residential/consumer and commercial water ozonation systems are available to provide such functionality.

One example of a consumer water ozonation system is described in commonly assigned United States Patent Application Publication No. US-2008-0190825-A1, which is incorporated herein by reference in its entirety. Such a system can include a removable filter cartridge. The removable filter cartridge facilitates better ozonation of water by way of a desiccant material provided therein to remove moisture, thereby achieving a higher concentration of ozone gas in the ozonated water.

Some cartridges and systems can include functionality to assist in determining when the cartridge should be replaced. For example, the cartridge in the '825 publication referred to above can have a "window" to assist in determining when the cartridge should be replaced, based on an observed colour of desiccant material. Other systems can provide an alarm or other indication when the cartridge reaches or approaches an end of life condition.

While different types of commercial ozonation systems or devices can both use cartridges, the cartridges used in each type of device are typically different from each other, and count usage in different ways, such as by cycles completed or by time used.

It is, therefore, desirable to provide a cartridge and ozonation system that enable use of the same cartridge in different types of ozonation devices.

SUMMARY OF THE INVENTION

It is an object of the present application to obviate or mitigate at least one disadvantage of previous ozonation systems. In one aspect, a system for providing an ozonated liquid is described. The system comprises a liquid inlet and a liquid outlet. The liquid inlet is arranged to continuously accept a liquid into the system at a desired flow rate; the liquid outlet to dispense ozonated liquid out of the system, the ozonated liquid having an oxidation-reduction potential of at least 450 mV due solely to ozone dissolved in the liquid, the liquid outlet being in fluid communication with the liquid inlet and arranged to dispense the ozonated liquid out of the system at the desired flow rate. The system also comprises a tank-less ozonation flow path which is adapted to ozonate the accepted liquid, producing the ozonated liquid to be dispensed out of the system, the accepted liquid having a fluid residence time in the ozonation flow path of less than about 5 minutes prior to being dispensed as the ozonated liquid.

In another aspect, a system for providing an ozonated liquid is described. The system comprises a tank-less ozonation flow path having a liquid inlet and a liquid outlet. The liquid inlet is arranged to continuously accept a substantially unozonated liquid into the ozonation flow path at a desired flow rate; a liquid outlet to dispense ozonated liquid out of the system, the ozonated liquid having an oxidation-reduction potential of at least 450 mV due solely to ozone dissolved in the liquid, the liquid outlet being in fluid communication with the liquid inlet and arranged to dispense the ozonated liquid out of the system at the desired flow rate. The tank-less ozonation flow path is adapted to ozonate the accepted liquid, producing the ozonated liquid to be dispensed out of the system, the accepted liquid having a fluid residence time in the ozonation flow path of less than about 5 minutes prior to being dispensed as the ozonated liquid.

The liquid can be accepted at an accepted pressure less than 110 psi. The ozonated liquid can be dispensed at a dispensing pressure which is directly dependent on the accepted pressure. The accepted pressure can be between about 20 and about 100 psi, and the dispensing pressure can be between about 20 and about 100 psi.

The ozonated liquid discharged from the system can have an oxidation-reduction potential of at least 650 millivolts. The fluid residence time in the system can be less than 1 minute.

The ozonation flow path can comprise a liquid-gas mixer, in fluid communication with the liquid inlet, to mix the accepted liquid with gaseous ozone to produce a gaseous liquid; and a gas-liquid separator, in fluid communication with the liquid-gas mixer, to separate the gaseous liquid into degassed ozonated liquid and separated gaseous ozone. The liquid-gas mixer can be a venturi for mixing the liquid with ozone gas. The fluid residence time between the liquid-gas mixer and the gas-liquid separator can be between about 0.01 and 0.1 seconds. In particular aspects, the liquid inlet of the ozonation flow path can be the liquid-gas mixer and the residence time of the ozonation flow path can be measured between the liquid-gas mixer and the liquid outlet.

The gas-liquid separator is for separating a gaseous liquid into a degassed liquid and a separated gas, the gaseous liquid comprising bubbles of undissolved gas and a liquid, the degassed liquid comprising dissolved gas. The gas-liquid separator can comprise a tubular member having a side wall, and top and bottom end walls, the tubular member having an upper portion and a lower portion; a gaseous liquid inlet for entry of the gaseous liquid, the inlet located in the lower portion of the tubular member and arranged to create a vortex of the gaseous liquid in the gas-liquid separator; a gas outlet located in the upper portion of the tubular member, the gas outlet arranged to vent the separated gas out of the gas-liquid separator; a liquid outlet for egress of the degassed liquid from the lower portion of the gas-liquid separator; and a separating mixer positioned in the lower portion of the tubular member and secured to the side wall of the tubular member.

The separating mixer can comprise an annular separating baffle concentric with the tubular member and arranged to direct the flow of the degassed liquid towards the liquid outlet and to direct the separated gas away from the liquid outlet, the separating baffle and the side wall defining an annular degassed liquid region therebetween; and an annular mixing baffle concentric with the annular separating baffle, the radius of the annular mixing baffle is smaller than the radius of the annular separating baffle.

The annular separating baffle and the annular mixing baffle can be concentric and share a common center. The annular separating baffle can be positioned in line with the liquid outlet. The annular degassed liquid region can be open at both a top end and a bottom end, the degassed liquid flowable between the top end and the bottom end. The liquid outlet can be for egress of the degassed liquid from the annular degassed liquid region.

The gaseous liquid inlet can be positioned substantially tangential to the side wall of the tubular member. The liquid outlet can be an annular aperture defined by the side wall or can be positioned substantially tangential to the side wall of the tubular member.

The gas-liquid separator can alternatively comprise a tubular member having a side wall, and top and bottom end walls, the tubular member having an upper portion and a lower portion; a gaseous liquid inlet for entry of the gaseous liquid, the inlet located in the lower portion of the tubular member and arranged to create a vortex of the gaseous liquid in the gas-liquid separator; a gas outlet located in the upper portion of the tubular member, the gas outlet arranged to vent the separated gas out of the gas-liquid separator; an annular separating baffle positioned in the lower portion of the tubular member and secured to the side wall of the tubular member, the annular separating baffle arranged to direct the flow of the degassed liquid towards the liquid outlet and to direct the separated gas away from the liquid outlet, the annular separating baffle and the side wall defining an annular degassed liquid region therebetween which is open at both top and bottom ends, the degassed liquid flowable between the top and bottom ends; and a liquid outlet for egress of the degassed liquid from the annular degassed liquid region.

The annular separating baffle can be positioned in line with the liquid outlet. The gaseous liquid inlet can be positioned substantially tangential to the side wall of the tubular member. The liquid outlet can be an annular aperture defined by the side wall, positioned substantially tangential to the side wall of the tubular member.

In an aspect, a gas-liquid separator is provided for separating a gaseous liquid into a degassed liquid and a separated gas, the gaseous liquid comprising bubbles of undissolved gas, the degassed liquid comprising dissolved gas.

The gas-liquid separator comprises a tubular member having a side wall, and top and bottom end walls, the tubular member having an upper portion and a lower portion; a gaseous liquid inlet for entry of the gaseous liquid, the inlet located in the lower portion of the tubular member and arranged to create a vortex of the gaseous liquid in the gas-liquid separator; a gas outlet located in the upper portion of the tubular member, the gas outlet arranged to vent the separated gas out of the gas-liquid separator; a separating mixer positioned in the lower portion of the tubular member and secured to the side wall of the tubular member; and a liquid outlet for egress of the degassed liquid from the lower portion of the gas-liquid separator.

The separating mixer comprises an annular separating baffle concentric with the tubular member and arranged to direct the flow of the degassed liquid towards the liquid outlet and to direct the separated gas away from the liquid outlet, the separating baffle and the side wall defining an annular degassed liquid region therebetween; and an annular mixing baffle concentric with the annular separating baffle, the radius of the annular mixing baffle is smaller than the radius of the annular separating baffle.

The annular separating baffle and the annular mixing baffle can share a common center. The annular separating baffle can be positioned in line with the liquid outlet. The annular degassed liquid region can be open at both a top end and a bottom end, with the degassed liquid flowable between the top end and the bottom end. The annular degassed liquid region can be for egress of the degassed liquid from the annular degassed liquid region The gaseous liquid inlet can be a tangential inlet. The liquid outlet can be an annular aperture defined by the side wall or a tangential outlet positioned in the side wall.

In another aspect, the separator comprises a tubular member having a side wall, and top and bottom end walls, the tubular member having an upper portion and a lower portion; a gaseous liquid inlet for entry of the gaseous liquid, the inlet located in the lower portion of the tubular member and arranged to create a vortex of the gaseous liquid in the gas-liquid separator; a gas outlet located in the upper portion of the tubular member, the gas outlet arranged to vent the separated gas out of the gas-liquid separator; an annular separating baffle positioned in the lower portion of the tubular member and secured to the side wall of the tubular member, the annular separating baffle arranged to direct the flow of the degassed liquid towards the liquid outlet and to direct the separated gas away from the liquid outlet, the annular separating baffle and the side wall defining an annular degassed liquid region therebetween which is open at both top and bottom ends, the degassed liquid flowable between the top and bottom ends; and a liquid outlet for egress of the degassed liquid in the annular degassed liquid region.

The annular separating baffle can be positioned in line with the liquid outlet. The gaseous liquid inlet can be a tangential inlet. The liquid outlet can be an annular aperture defined by the side wall or a tangential outlet positioned in the side wall.

In an aspect of the present application, a cartridge-enhanced water treatment system is provided. The water treatment system includes a cartridge; a first ozonation device of a first type including a first device cycle count manager configured to signal the cartridge upon completion of an ozonation cycle of the first ozonation device with respect to a first ozonation device cycle count condition; and a second ozonation device of a second type, the second type different from the first type, the second ozonation device including a second device cycle count manager configured to signal the cartridge upon completion of an ozonation cycle of the second ozonation device with respect to a second ozonation device cycle count condition; the cartridge being arranged for integration and independent use with the first ozonation device and with the second ozonation device, and including: an air inlet to receive atmospheric air; a material to remove moisture and/or nitrogen from the received atmospheric air; an air outlet for interfacing with one of the first and second ozonation devices to provide dry and/or oxygen enriched air to an ozone generator; a usage counter arranged to modify a stored usage count in response to receipt of a signal from the first or second cycle count managers, and a device interface arranged to provide an expiry indication indicating that the cartridge is no longer suitable for further use, based on the stored usage count.

The first and second cycle count managers can each comprise a cycle memory arranged to keep track of partially completed cycles.

The cartridge can include a cartridge compatibility identifier; and the first and second ozonation devices can include: first and second device compatibility identifiers, respectively, and first and second device compatibility managers can be arranged to determine whether the cartridge is compatible with the first or second ozonation device, respectively, based on a comparison of the cartridge compatibility identifier with the first and second device compatibility identifiers, respectively.

The first and second device compatibility managers can determine that the cartridge is compatible with the first or second ozonation device when the cartridge compatibility identifier is the same as the first or second ozonation device compatibility identifier, respectively.

The first and second device compatibility managers can determine that the cartridge is compatible with the first or second ozonation device when the first or second ozonation device compatibility identifier identifies a device class with which the cartridge compatibility identifier is compatible.

The cartridge can be compatible with a plurality of types of ozonation device of the identified device class. The usage counter can be reset in response to receipt of a usage counter reset signal.

The system can further include a usage counter reset manager, in communication with the cartridge, arranged to send a usage counter reset signal to reset the usage counter in the cartridge. The usage counter reset manager can be arranged to determine an expected life of a dried desiccant material prior to sending the usage counter reset signal. The usage counter reset manager can be arranged to provide a modified value with which the usage counter can be reset, the modified value being based on measured properties of the desiccant material.

The cartridge can be a desiccant cartridge that includes a material to remove moisture from the received atmospheric air.

The first ozonation device of a first type can be a water ozonation system that includes a liquid inlet arranged to continuously accept a liquid into the system at a desired flow rate; a liquid outlet to dispense ozonated liquid out of the system, the ozonated liquid having an oxidation-reduction potential of at least 450 mV due solely to ozone dissolved in the liquid, the liquid outlet being in fluid communication with the liquid inlet and arranged to dispense the ozonated liquid out of the system at the desired flow rate; a tank-less ozonation flow path between the liquid inlet and the liquid outlet, the flow path adapted to ozonate the accepted liquid, producing the ozonated liquid to be dispensed out of the system, the accepted liquid having a fluid residence time in the ozonation flow path of less than 5 minutes prior to dispensing as the ozonated liquid; an ozone generator having an air inlet for interfacing with the air outlet of the cartridge and arranged to provide generated ozone to the ozonation flow path. The second ozonation device of a second type can be a water ozonation system that includes a reservoir for containing and dispensing a liquid; an ozone generator having an air inlet for interfacing with the air outlet of the cartridge and arranged to provide generated ozone to a liquid-gas mixer for increasing the level of oxidative properties in said liquid; a circulation flow path communicating with said reservoir and said liquid-gas mixer to allow at least some of said liquid in said reservoir to flow from said reservoir to said liquid-gas mixer and back to said reservoir.

In another aspect of the present application, a cartridge, arranged for integration and use with first and second ozonation devices of different types, is provided. The cartridge includes an air inlet to receive atmospheric air; a material to remove moisture and/or nitrogen from the received atmospheric air; an air outlet for interfacing with one of the first and second ozonation devices to provide dry and/or oxygen enriched air to an ozone generator; a usage counter arranged to modify a stored usage count in response to receipt of a first cycle completion signal received from the first ozonation device representing completion of an ozonation cycle with respect to a first ozonation device cycle count condition, and to modify the stored usage count in response to receipt of a second cycle completion signal received from the second ozonation device representing completion of an ozonation cycle with respect to a second ozonation device cycle count condition; a device interface arranged to provide an expiry indication indicating that the cartridge is no longer suitable for further use based on the stored usage count.

In a further aspect of the present applicant, a method is provided of removing moisture from atmospheric air using a cartridge described above. The method includes receiving the atmospheric air from the air inlet; contacting the desiccant material with the received atmospheric air; providing dry air to an ozone generator through the dry air outlet; modifying the stored usage count in response to: (a) the first cycle completion signal received from the first ozonation device representing completion of an ozonation cycle with respect to a first ozonation device cycle count condition, or (b) the second cycle completion signal received from the second ozonation device representing completion of an ozonation cycle with respect to a second ozonation device cycle count condition; providing an expiry indication when the cartridge is no longer suitable for further use based on the stored usage count.

The first and second cycle count managers can each comprise a cycle memory, and the method further can include keeping track of partially completed cycles using the cycle memory.

The method can further include resetting the usage counter in response to receipt of a usage counter reset signal.

The method can further include sending the usage counter reset signal by a usage counter reset manager in communication with the cartridge.

The method can further include determining, at the usage counter reset manager, an expected life of a dried desiccant material prior to sending the usage counter reset signal.

The method can further include providing a modified value with which the usage counter can be reset, the modified value being based on measured properties of the desiccant material and being provided by the usage counter reset manager Other aspects and features of the present application will become apparent to those ordinarily skilled in the art upon review of the following description of specific embodiments of the application in conjunction with the accompanying figures.

BRIEF DESCRIPTION OF THE DRAWINGS

Embodiments of the present application will now be described, by way of example only, with reference to the attached Figures, wherein.

DETAILED DESCRIPTION

Figure 1:
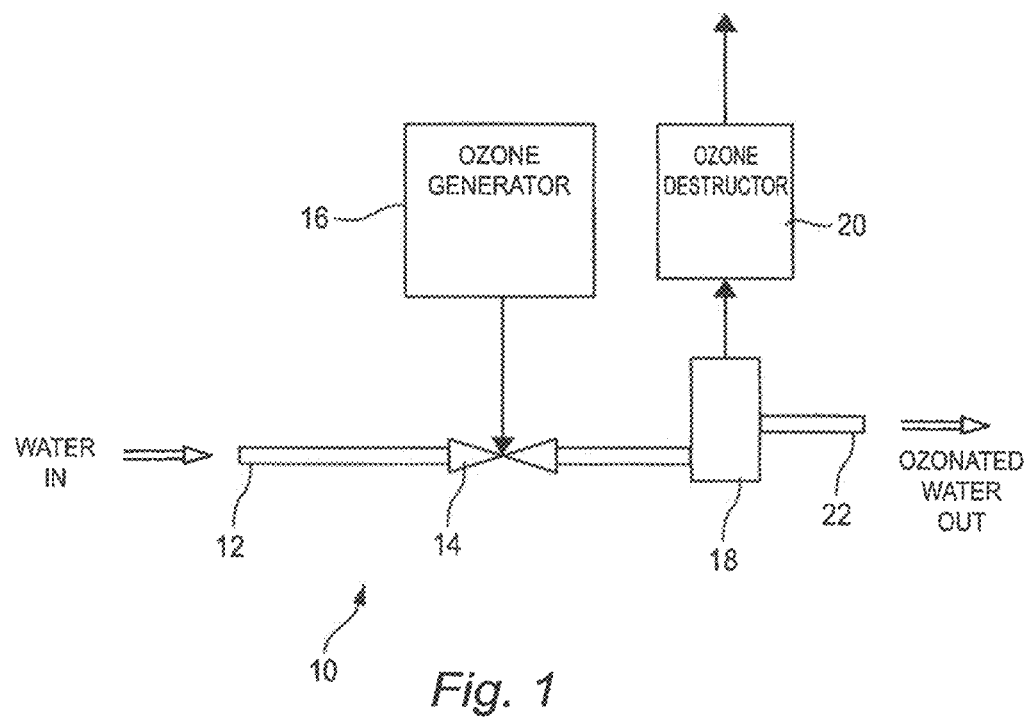
FIG. 1 is a schematic of a holding tank-less ozonation system according to one embodiment of the present application.

Generally, the present application provides a method and system for generating ozonated liquid. While the following description describes the ozonation of water, it is appreciated that the principles of the application, which are demonstrated by the following embodiments, can be equally applied to the ozonation of other liquids (for example: organic solvents, oils, mixtures of water and additives). It is appreciated that additives can affect the oxidation-reduction potential of ozonated water and/or the stability of the ozonated water. It may, therefore, be desirable to include such additives when producing ozonated water. Contemplated additives include, for example, acetic acid. Additionally, while the following description describes the separation of ozone from water, it is to be understood that the principles described herein, which are described in relation to particular embodiments, can be equally applied to the separation of other gases (for example: oxygen, nitrogen, hydrogen, chlorine, fluorine) from other liquids (for example: organic solvents, oils).

The present application describes a system which provides an ozonated liquid. In one aspect, the system can comprises a liquid inlet arranged to continuously accept a liquid into the system at a desired flow rate; a liquid outlet to dispense ozonated liquid out of the system, the ozonated liquid having an oxidation-reduction potential of at least 450 mV due solely to ozone dissolved in the liquid, the liquid outlet being in fluid communication with the liquid inlet and arranged to dispense the ozonated liquid out of the system at the desired flow rate. This system has a tank-less ozonation flow path between the liquid inlet and the liquid outlet, the flow path being adapted to ozonate the accepted liquid, producing the ozonated liquid to be dispensed out of the system. The accepted liquid has a fluid residence time in the ozonation flow path of less than 5 minutes prior to being dispensed as the ozonated liquid.

In another aspect, the system can comprises a tank-less ozonation flow path having a liquid inlet and a liquid outlet, the liquid inlet arranged to continuously accept a substantially unozonated liquid into the ozonation flow path at a desired flow rate; the liquid outlet to dispense ozonated liquid out of the system, the ozonated liquid having an oxidation-reduction potential of at least 450 mV due solely to ozone dissolved in the liquid, the liquid outlet being in fluid communication with the liquid inlet and arranged to dispense the ozonated liquid out of the system at the desired flow rate. The tank-less ozonation flow path is adapted to ozonate the accepted liquid, producing the ozonated liquid to be dispensed out of the system. The accepted liquid has a fluid residence time in the ozonation flow path of less than 5 minutes prior to being dispensed as the ozonated liquid.

Embodiments of the present application are non-recirculating systems having a holding tank-less ozonation flow path with a liquid inlet and liquid outlet. Such tank-less, non-recirculating systems accept liquid so long as liquid is being dispensed from the system, and dispense liquid so long as the system is accepting liquid. Liquid is only dispensed when more accepted liquid enters the system. In order to dispense ozonated liquid, the accepting, dispensing and ozonating must all occur at the same time.

One particular embodiment of a system according to the present application is illustrated as element 10 in FIG. 1. The liquid inlet 12 is arranged to accept water to be ozonated into the system. In the illustrated embodiment, the liquid inlet 12 accepting water into the system accepts liquid directly into the ozonation flow path. However, it is to be understood that it is not necessary for the liquid inlet 12 to accept liquid into the ozonation system and that the ozonation flow path can accept liquid which has already been accepted by the ozonation system. The liquid inlet 12 continuously accepts the water as long as ozonated water is being produced. Water flows at a desired flow rate into venturi 14. Ozone gas provided by an ozone generator 16 is mixed with the water in venturi 14.

The ozone-water mixture flows into gas-liquid separator 18, which separates the gas-liquid mixture into degassed ozonated water and separated ozone gas. The separated ozone gas is destroyed in ozone destructor 20 and oxygen gas is vented to the atmosphere. Degassed ozonated water is provided to liquid outlet 22 by the gas-liquid separator 18. Liquid outlet 22 dispenses ozonated liquid at the desired flow rate (e.g. for use by an end user). The flow rate out of the liquid outlet 22 is the same as the flow into the liquid inlet 12 since the flow in is directly dependent on the flow out and any liquid accepted by the system must displace liquid within the system. It is appreciated that in a system having a tank, the flow in is not directly dependent on the flow out and liquid could be dispensed from the tank even if no liquid was flowing into the system.

In the context of the present application, "directly dependent on" is to be understood to mean that the ozonation flow path is connected such that changes to the accepted pressure result in changes to the dispensing pressure and, similarly, that changes to the inlet flow rate result in changes to the dispensing flow rate. Changes to the accepted pressure result in changes to the dispensing pressure since the contemplated systems do not include any pressure regulating systems. For example, if the accepted pressure is initially 80 psi and the dispensing pressure is 60 psi, and the accepted pressure was dropped to 60 psi, the dispensing pressure would drop to 40 psi since the dispensing pressure is directly dependent on the accepted pressure. Likewise, changes to the inlet flow rate result in changes to the dispensing flow rate since there is no holding tank and accepted liquid displaces liquid already in the system, resulting in dispensed liquid.

Ozonation systems according to embodiments of the present application can also have the dispensing pressure be substantially equal to accepted pressure. Substantially equal pressure is to be understood to mean that the dispensing pressure is about 60 psi less than the accepted pressure, and in particular embodiments is about 40 psi, about 30 psi, about 20 psi or about 10 psi less than the accepted pressure.

Ozonation systems according to embodiments of the present application can also have the dispensing flow rate be substantially equal to the accepted flow rate. In particular embodiments of the ozonation system according to the present application, the system can have a dosing system to add an additive to the accepted liquid, resulting in an dispensing flow rate that is larger than the accepted flow rate. In particular embodiments of the ozonation system according to the present application, the system can have a leak or other liquid outlet in advance of the dispensing liquid outlet, resulting in an dispensing flow rate that is less than the accepted flow rate. Substantially equal flow rate is to be understood to mean that the dispensing flow rate is between about 80% and 120% of the accepted flow rate, and in particular embodiments is between about 90% and about 110%, about 95% and about 105%, or about 99% and about 101% of the accepted flow rate.

Liquid-Gas Mixer.

Ozonation systems according to embodiments of the present application can have a liquid-gas mixer for mixing the ozone and the liquid. In the system illustrated in FIG. 1, the liquid-gas mixer is venturi 14. As described above, the liquid-gas mixer 14 is in fluid communication with the liquid inlet 12 and is arranged to dissolve ozone gas in the liquid to produce the ozonated liquid. Liquid-gas mixers are well known in the art, and include such mixers as venturi mixers. Briefly, a venturi mixer is a tube with a constricted flow path, which causes an increase in flow velocity and a corresponding decrease in pressure. The decrease in pressure results in a pressure differential, which draws gas into the liquid.

Gas-Liquid Separator.

Contemplated systems can also have a gas-liquid separator in fluid communication with both the liquid gas-mixer and the liquid outlet. The gas-liquid separator, shown as element 18 in the embodiment illustrated in FIG. 1, can be arranged to separate undissolved ozone gas from the ozonated liquid.

In particular embodiments, the ozonation system according to the present invention includes a gas-liquid separator which can separate ozone from water at high flow rates. The gas-liquid separator can comprise a tubular member; a gaseous liquid inlet for entry of the gaseous liquid, the inlet arranged to create a vortex of the gaseous liquid in the gas-liquid separator; a gas outlet arranged to vent the separated gas out of the gas-liquid separator; a separating mixer secured to the tubular member; and a liquid outlet for egress of the degassed liquid from the annular degassed liquid region.

The separating mixer can comprise an annular separating baffle concentric with the tubular member and arranged to direct the flow of the degassed liquid towards the liquid outlet and to direct the separated gas away from the liquid outlet, the separating baffle and the side wall of the tubular member defining an annular degassed liquid region therebetween. The separating mixer can further comprise an annular mixing baffle concentric with the annular separating baffle, the radius of the annular mixing baffle being smaller than the radius of the annular separating baffle.

Figure 2:
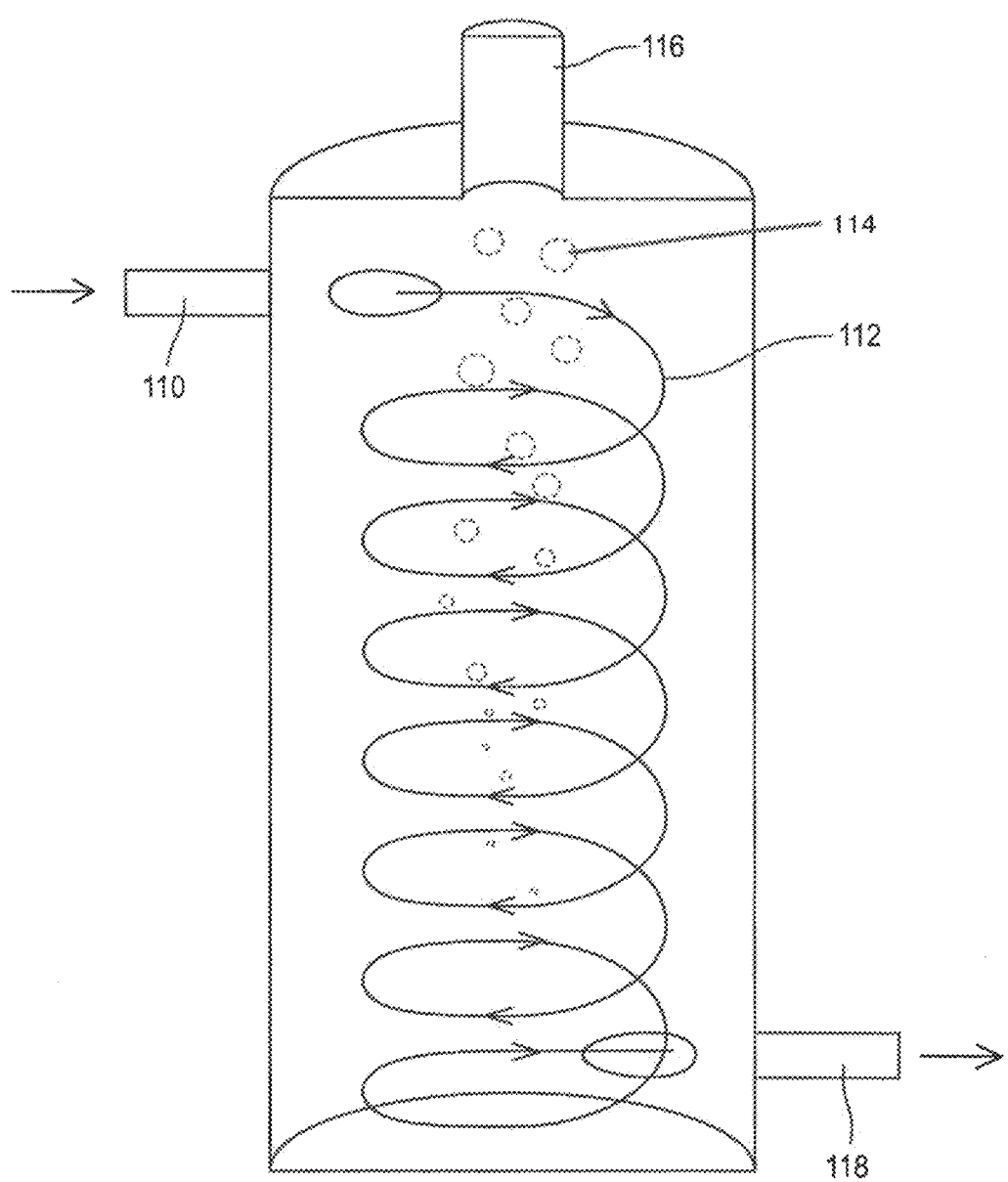
FIG. 2 is a cross-sectional view of a known gas-liquid separator.

Previously known gas-liquid separators are illustrated in FIG. 2 and include gas-liquid inlet 110 for inducing vortex flow 112. The gaseous liquid injected via inlet 110 separates into separated gas and degassed liquid. The separated gas coalesces into bubbles 114 and is vented out of the gas-liquid separator via gas outlet 116. The degassed liquid is dispensed from the gas-liquid separator via degassed liquid outlet 118.

Figure 3:
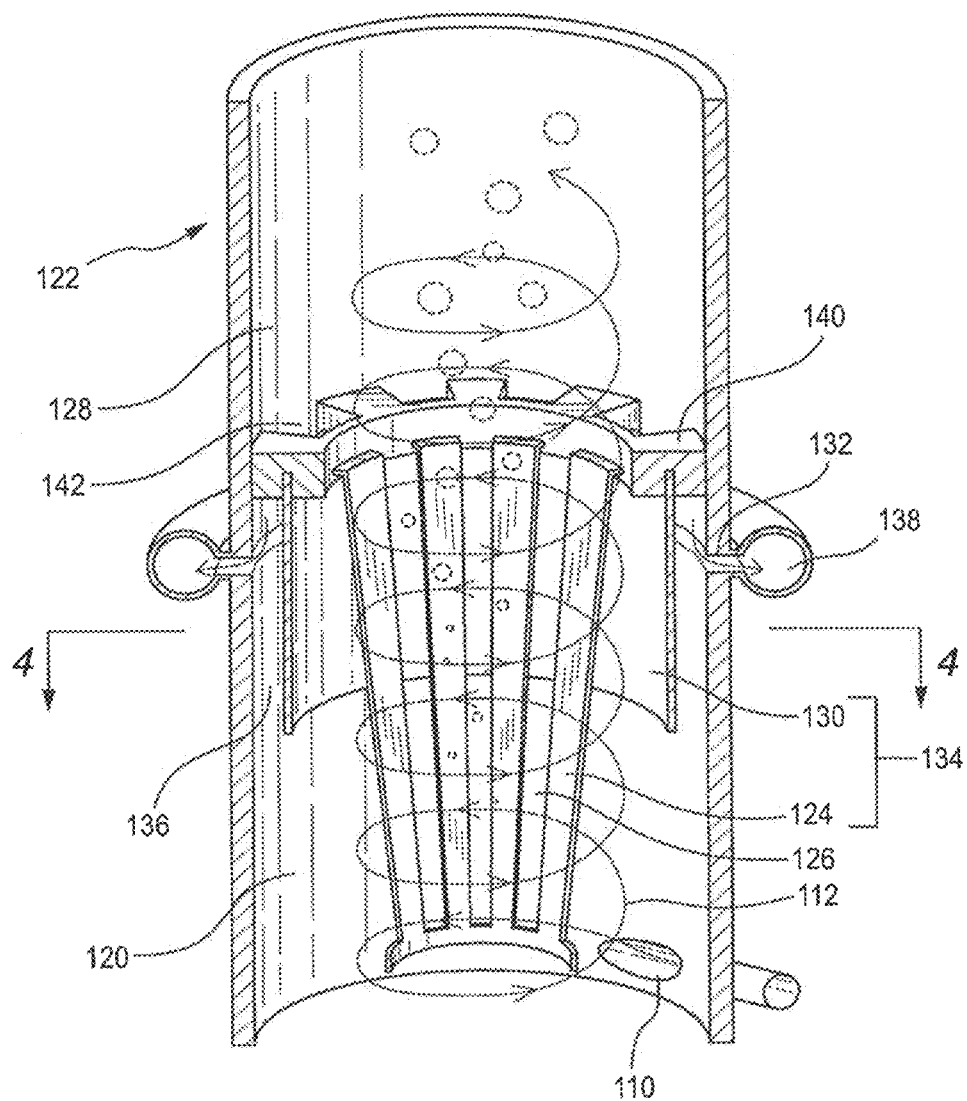
FIG. 3 is an exploded cross-sectional view of a gas-liquid separator usable in a holding tank-less ozonation system according to one embodiment of the present application.

FIG. 3 illustrates one embodiment of a gas-liquid separator as described herein. In use, gaseous liquid enters a tangentially positioned gas-liquid inlet 110, which is positioned in a lower portion 120 of tubular interior chamber 122. The gas-liquid inlet 110 induces a vortex flow 112 of gaseous liquid. The gaseous liquid is injected at a flow rate sufficient to induce a vortex flow 112 of the gaseous liquid within the interior chamber 122. Such a vortex flow 112 has a center of rotation and a low-pressure zone located at the center of rotation. The vortex flow 112 has a high-pressure zone around the periphery of the vortex flow 112, for example where the liquid contacts the tubular interior chamber 122.

The vortex flow 112 of liquid first encounters mixing baffle 124, which creates turbulence in the vortex flow 112 of gaseous liquid, thereby breaking up bubbles and increasing the total surface area of the bubbles. This increase in surface area can enhance the dissolution of the gas into the liquid. A mixer, therefore, should be understood to be a turbulence enhancer which increases the amount of dissolved gas in the degassed liquid. Mixing baffle 124 defines a plurality of apertures 126 for fluid communication between the inner and outer regions defined by the mixing baffle 124. The apertures 126 are illustrated as slots extending axially along the central longitudinal axis. The slots can be evenly spaced around the baffle and equally spaced from each other.

In an embodiment of a gas-liquid separator according to the present application, a mixer can also act to direct bubbles of separated ozone gas in to the upper portion of the tubular interior chamber, thereby ensuring that the bubbles are directed to the gas outlet.

It is to be understood that, in a vortex flow, the pressure on a fluid element is a function of the centrifugal force exerted on that fluid element, which is a function of the velocity and the distance from the central longitudinal axis. The pressure is, therefore, lowest along the center of rotation (where the centrifugal force is smallest) and the pressure is greatest along the periphery of the vortex (where the centrifugal force is largest). The low pressure zone expedites bubbles of undissolved gas coalescing together. Gas separates from the liquid due to the vortex flow 112, coalesces and rises towards the upper portion 128 of the tubular interior chamber 122. The vortex flow 112 of gaseous liquid eventually becomes a vortex flow of degassed liquid as the degassed liquid separates from the separated gas.

The vortex flow 112 of liquid next encounters separating baffle 130, which is positioned in line with degassed liquid outlet 132. It is desirable to prevent bubbles of gas from exiting the gas-liquid separator through the degassed liquid outlet 132. In a situation of vortex flow, where the degassed liquid outlet 132 is positioned in the high-pressure zone at the periphery of the vortex flow 112, bubbles of gas can be swept into the degassed liquid outlet 132 before they coalesce in the low pressure zone. In order to direct bubbles of gas away from the degassed liquid outlet 132, devices as described herein have a separating baffle 130 positioned in line with the degassed liquid outlet 132. Separating baffle 130 can be positioned to create a thin slit between the side wall and baffle, the thin slit for directing the degassed liquid to the degassed liquid outlet 132 and for trapping bubbles of gas that have not coalesced in the upper portion 128 of the tubular interior chamber 122. In an embodiment according to the present application, the separating baffle can be co-axial to the degassed liquid outlet 132.

Degassed liquid outlet 132 is positioned at the periphery of the vortex, in the high-pressure zone, in order to provide egress for liquid which has been degassed. The separating baffle 130 directs separated gas away from the degassed liquid outlet 132 and degassed liquid towards degassed liquid outlet 132. The combination of mixing baffle 124 and separating baffle 130 are one embodiment of separating mixer 134. It is to be understood that a separating mixer enhances the turbulence in a fluid, increasing the amount of dissolved gas in the degassed liquid, and directs separated gas away from the liquid outlet while directing the degassed liquid towards the liquid outlet.

The degassed liquid outlet 132 is positioned above the gas-liquid inlet 110 and below gas outlet (not shown). The liquid outlet 132 accepts the degassed fluid from the high-pressure zone and allows the degassed fluid to flow out of the interior chamber 122. The degassed liquid outlet 132 is understood to be properly positioned when it is sufficiently far away from both the gaseous liquid inlet 110 and the gas outlet that neither the gaseous liquid nor the separated gas exits via the degassed liquid outlet during conditions of vortex flow. It can also be desirable to position the degassed liquid outlet 132 close to the gaseous liquid inlet 110 and the gas outlet so that the gas-liquid separator does not become overly large. In this manner, the gas-liquid separator can be as small as possible without compromising the effectiveness of the gas-liquid separator.

The separating baffle 130 and side wall of the interior chamber 122 define a degassed liquid region 136 therebetween. The separating baffle 130 is spaced apart from the side wall. The degassed liquid region 136 is open at the top and bottom ends, and liquid can flow through the degassed liquid region 136 between the top and bottom ends. FIG. 3 illustrates the liquid outlet 132 as an annular aperture defined by side walls of the interior chamber 122. The liquid outlet 132 leads to collecting outlet 138, which provides a flow of the degassed liquid.

Without being bound by theory, it is believed that in the embodiment illustrated in FIG. 3, liquid in the upper portion 128 of the tubular interior chamber 122 has a higher ORP value as it has had a longer contact time with the ozone gas. It is further believed that this liquid can flow into the degassed liquid outlet 132 via the open top end of the degassed liquid region 136 without impediment. In contrast, in a gas-liquid separator having a degassed liquid region with a closed top end, it is believed that liquid in the upper portion 128 of the tubular interior chamber 122 would have to flow into the degassed liquid outlet 132 by first flowing down the center area, against the direction of flow of the remaining liquid.

One possible arrangement for securing both the mixing baffle 124 and the separating baffle 130 to the side wall is via holder 140, which engages the side wall and the top ends of both the mixing baffle 124 and the separating baffle 130 so that none of the holder 140, mixing baffle 124 and separating baffle 130 disengage from the side wall when the gas-liquid separator is subjected to vortex flow 112.

Holder 140 and the side wall of the tubular chamber 122 defines apertures 142 through which fluid can flow into or out of the annular degassed liquid region 126 and further defines at least one center opening through which the gaseous liquid and bubbles can flow. Holder 140, mixing baffle 136 and separating baffle 122 illustrate one embodiment of a separating mixer 134 secured to the side wall.

Figure 4:
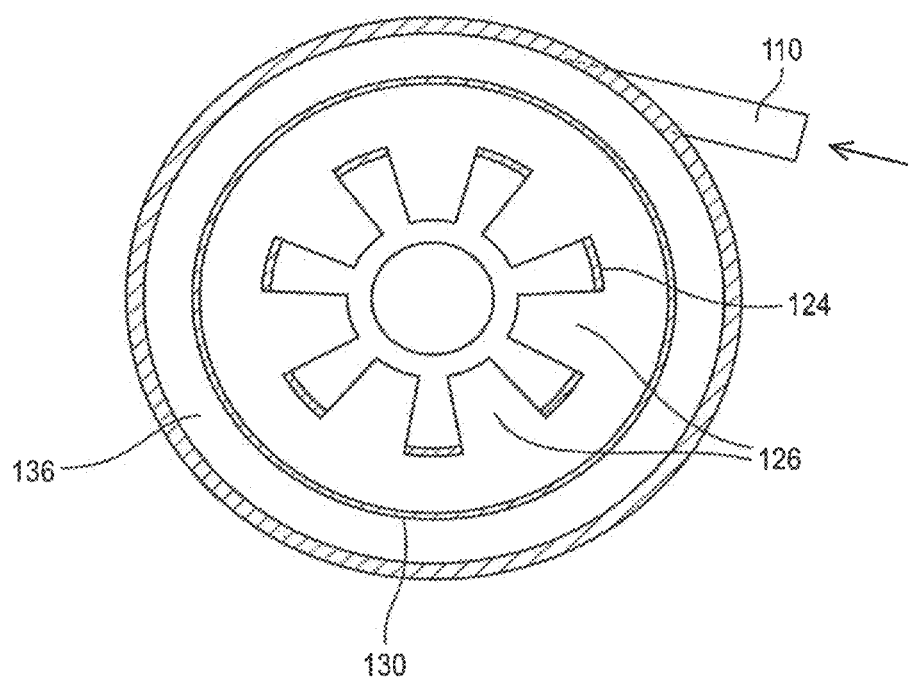
FIG. 4 is a view taken along line 4-4 of FIG. 3.

FIG. 4 is a view along line 4-4 of FIG. 3. FIG. 4 shows the annular degassing liquid region 136, the mixing baffle 124 and the apertures 126 defined therein. FIGS. 3 and 4 illustrate the mixing baffle 124 as being positioned concentrically with separating baffle 130 with the separating baffle 130 having a larger radius than the mixing baffle 124. That is to say that the separating baffle and tubular interior chamber share a common longitudinal axis.

Although FIGS. 3 and 4 illustrate the separating baffle 124 and mixing baffle 130 as having a common center, it is to be understood that they would still be "positioned concentrically" as long as the longitudinal axis is shared, even if the mixing baffle 124 is positioned below the separating baffle 130 and they no longer share a common center.

As illustrated in FIG. 3, the degassed liquid outlet 132 can be a substantially annular aperture defined by the side walls of the substantially tubular interior chamber 122. In other embodiments, the degassed liquid outlet 132 can be a plurality of apertures defined by the side walls of the chamber. In yet other embodiments, the degassed liquid outlet can be a tangential outlet in the side wall. The total cross-sectional area of the degassed liquid outlet 132 can be equal to or slightly larger than the cross-sectional area of the gas-liquid inlet 110. For example, if the cross-sectional area of the gas-liquid inlet 110 is 78.5 mm$^2$ (e.g. a tube having a radius of 5 mm), then the degassed liquid outlet 132 can be an annular aperture having a vertical height of 0.5 mm if the substantially tubular interior chamber 122 has a radius of 25 mm (area=$2\pi rh$).

In embodiments where the degassed liquid outlet is an annular aperture defined by the side walls or a plurality of apertures defined by the side walls, the separating baffle can be annular in shape and define an annular degassed liquid region (as illustrated by element 136 in FIG. 3) between the separating baffle 130 and the side wall of the substantially tubular chamber 122. The cross-sectional area of the annular degassed liquid region 136, measured as the area between the separating baffle 130 and the side wall when viewed along the longitudinal axis of the interior chamber, can be 1.5× to 2.5× the cross-sectional area of the liquid-gas inlet 110 and/or the degassed liquid outlet 132.

In embodiments where the degassed liquid outlet is a tangential outlet in the side wall, the separating baffle can be an annular baffle, one or more than one ribs or deflecting guides extending from the side or wall of the substantially tubular chamber, or the like.

Figure 5:
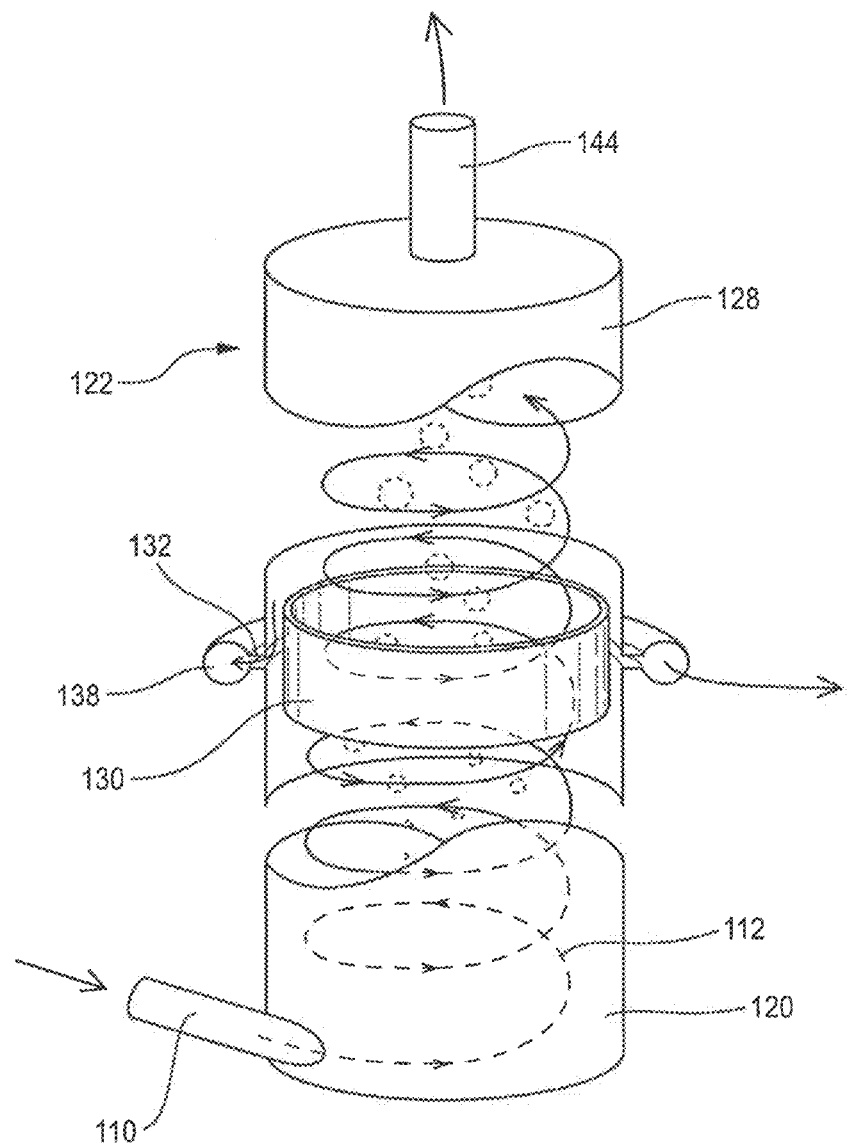
FIG. 5 is a close-up, cross-sectional view of another embodiment of a gas-liquid separator usable in a holding tank-less ozonation system according to one embodiment of the present application.

Another embodiment of a gas-liquid separator as described herein is illustrated in FIG. 5. As discussed with regard to the embodiment illustrated in FIGS. 3 and 4, gaseous liquid enters a tangentially positioned gas-liquid inlet 110, which is positioned in a lower portion 120 of tubular interior chamber 122. The gas-liquid inlet 110 induces a vortex flow 112 of gaseous liquid. The gaseous liquid is injected at a flow rate sufficient to induce a vortex flow 112 of the gaseous liquid within the interior chamber 122. Such a vortex flow 112 has a center of rotation and a low-pressure zone located at the center of rotation. The vortex flow 112 has a high-pressure zone around the periphery of the vortex flow 112, for example where the liquid contacts the tubular interior chamber 122.

The vortex flow 112 of liquid encounters separating baffle 130, which is positioned in line with degassed liquid outlet 132. Separating baffle 130 and the side wall of the tubular chamber 122 define degassed liquid region 136. As discussed above, degassed liquid region is open at the top and bottom ends, and liquid can flow through the degassed liquid region 136 between the top and bottom ends.

As discussed previously, it is desirable to prevent bubbles of gas from exiting the gas-liquid separator through the degassed liquid outlet 132. In a situation of vortex flow, where the degassed liquid outlet 132 is positioned in the high-pressure zone at the periphery of the vortex flow 112, bubbles of gas can be swept into the degassed liquid outlet 132 before they coalesce in the low pressure zone. In order to direct bubbles of gas away from the degassed liquid outlet 132, devices as described herein have a separating baffle 130 positioned in line with the degassed liquid outlet 132. The liquid outlet 132 leads to collecting outlet 138, which provides a flow of the degassed liquid.

As discussed with regard to the embodiment illustrated in FIGS. 3 and 4, the separated gas coalesces in the low-pressure zone to form bubbles, which further coalesce, leading to accumulation of the separated gas. The coalesced bubbles rise into the upper portion 128 of the interior chamber 122 and exit out of separated gas outlet 144. The separated gas outlet 144 allows the gas to escape the interior chamber 122 and is, therefore, positioned in the upper portion 128 of the interior chamber, where the separated gas would accumulate when the gas-liquid separator is use.

The gas-liquid separator can have a float (not shown) positioned in the interior chamber 122. When in use, the float is pushed up by the liquid and closes off the separated gas outlet 144. Separated gas accumulates and once sufficient gas collected, the float is displaced and separated gas outlet 144 is opened, allowing the collected gas to escape out of the separated gas outlet 144. Once the separated gas has been vented, the float rises and again close off the separated gas outlet 144. This allows the gas-liquid separator to maintain a relatively constant pressure within the interior chamber 122.

It is to be understood that a mixture of gas and liquid is injected into a gas-liquid separator. This mixture of gas and liquid includes bubbles of gas mixed in with the liquid. In the context of the present application, such a mixture is termed a "gaseous liquid". Inside the gas-liquid separator, the gaseous liquid is separated into a "degassed liquid" and "separated gas".

In particular embodiments as described herein, the gas-liquid separator can promote dissolving the gas into the liquid. In particular embodiments as described herein, the gas-liquid separator can promote vaporizing or otherwise adding liquid to the gas. It is, therefore, to be understood that the degassed liquid can have gas dissolved therein, and/or the separated gas can have liquid added thereto.

The term "degassed liquid" is, however, understood to represent liquid substantially lacking bubbles therein, even if the liquid has a gas dissolved therein. The term "separated gas" is to be understood to be the gas when it has substantially coalesced together, even if the gas has liquid added thereto.

It is to be understood that devices, as described herein, separate gas and liquid at high flow rates. It is to be understood that the term "high flow rate", when used in the context of the overall flow capacity of a gas-liquid separator as described herein, would mean a flow rate of greater than four volumes per minute, where one volume is equal to the volume of the gas-liquid separator.

Gas-liquid separators, as described herein, generally operate in a substantially vertical orientation, with a gaseous liquid inlet stream entering a lower portion of the device, separated gas exiting the device via a separated gas outlet in an upper portion of the device, and degassed liquid exiting the device via a degassed liquid outlet positioned between the gas-liquid inlet and the separated gas outlet.

The terms "upper" and "lower" are understood to refer to relative portions of the device when the device is positioned as it would be when it is in use. The term "lower portion" refers to the portion of the gas-liquid separator which through in which gaseous liquid and degassed liquid flow. The term "upper portion" refers to the portion of the gas-liquid separator in which the separated gas is collected before being vented out of the separator. In particular embodiments, the lower portion is conical or frustoconical with a half angle between about 5 and 7 degrees.

As illustrated in FIGS. 3, 4 and 5, the gas-liquid inlet 110 can be positioned substantially tangential to the interior chamber 122. However, it is to be understood that vortex flow 112 can be induced by methods other than the tangential entry of the gaseous liquid. For example, a gaseous liquid inlet can be positioned coaxial to the central longitudinal axis if the inlet includes a flow-deflection component to deflect axially inflowing liquid so that the desired vortex flow is induced.

One example of a flow-deflection component is a rotation-symmetrical base body element as described in U.S. Pat. No. 6,053,967. This flow deflection component includes deflection vanes, which are curved in planes perpendicular relative to the longitudinal axis of the chamber, to direct the axially inflowing water to form the desired vortex flow. Additionally, it is to be understood that vortex flow can be induced through mechanical methods, such as by the positioning of a motor-driven paddle in the substantially tubular chamber, where the motor-driven paddle drives vortex flow through physical displacement of the liquid.

In view of the desire to create a vortex flow inside the interior chamber, the term "substantially tubular interior chamber" is to be understood to mean a chamber that is shaped to encourage, not deter, a vortex flow. A chamber that deters a vortex flow may, for example, have a substantially square or rectangular horizontal cross-section since the side walls would discourage the flow of liquid circularly around the interior chamber. In contrast, a chamber that encourages a vortex flow could, for example, have a substantially oval or circular horizontal cross-section since the side wall(s) would direct the flow of liquid around the interior chamber. It is understood, however, that chambers with square or rectangular cross-sections can include other features that encourage vortex flow. In such situations, it is to be understood that the term "substantially tubular interior chamber" would encompass those chambers.

Ozone Source.

Ozone gas can be provided to the liquid-gas mixer (e.g. venturi 14 in FIG. 1) from a number of different sources. For example, a corona discharge system can be used to generate and provide the ozone gas. A corona discharge system uses an electrode with a high potential and takes oxygen gas and passes a current through the gas so as to ionize the gas and create a plasma around the electrode. The ionized gas recombines with oxygen to form ozone. The oxygen gas used in a corona discharge system can be oxygen from the air or from another oxygen source, for example the output from an oxygen concentrator. If air is used to generate ozone gas, a higher concentration of ozone can be achieved by reducing the amount of moisture in the provided air and/or increasing the concentration of oxygen (for example by removing nitrogen) in the provided air. Reducing the amount of moisture or increasing the concentration of oxygen can be achieved, for example, by using a removable cartridge, as described below. Corona discharge systems can use sustained ionization or intermittent ionization to generate ozone. Corona discharge typically uses two asymmetric electrodes: a highly curved electrode (e.g. tip of a needle or small diameter wire) and an electrode with a low curvature (e.g. a plate or ground). Coronas may be positive or negative, depending on the polarity of the voltage on the highly curved electrode. In particular embodiments, a negative corona discharge system is used. In some embodiments of known corona discharge systems, as much as 10 grams of ozone per hour can be provided.

Ozone Destructor.

Systems according to the present application may also include an ozone destruction assembly, or "ozone destructor", as illustrated by element 20 in FIG. 1. Ozone destructors are known in the art. Briefly, the ozone destruction assembly can include a gas inlet for accepting ozone gas from the gas-liquid separator 18. Ozone gas can be directed from the gas inlet to a destruction chamber with a catalyst for accelerating the decomposition of ozone into oxygen. The decomposition can be further accelerated by heating the destruction chamber and/or the ozone gas to be destroyed to an elevated temperature. In particular embodiments of the ozone destruction assembly, the catalyst is manganese dioxide or activated carbon. The resulting oxygen gas produced from the destruction of the ozone gas can be discharged to the atmosphere via an oxygen outlet.

Scrubber/Extractor.

The system for providing ozonated liquid according to the present application can be adapted or retrofitted to a mobile floor scrubber or extractor. Scrubbers and extractors are floor cleaners which eject a cleaning solution from a reservoir of clean liquid onto the floor and then remove the solution by vacuuming it into a reservoir of dirty liquid. Scrubbers and extractors are typically used in hospitals, hotels or other commercial or industrial settings.

When adapted to scrubbers or extractors, the contemplated system takes water from the clean reservoir as the liquid to be ozonated, passes the water through the ozonation flow path, and ejects the ozonated water as the cleaning solution. Used ozonated water vacuumed from the floor is then stored in a dirty reservoir until the scrubber or extractor is emptied.

Figure 6:
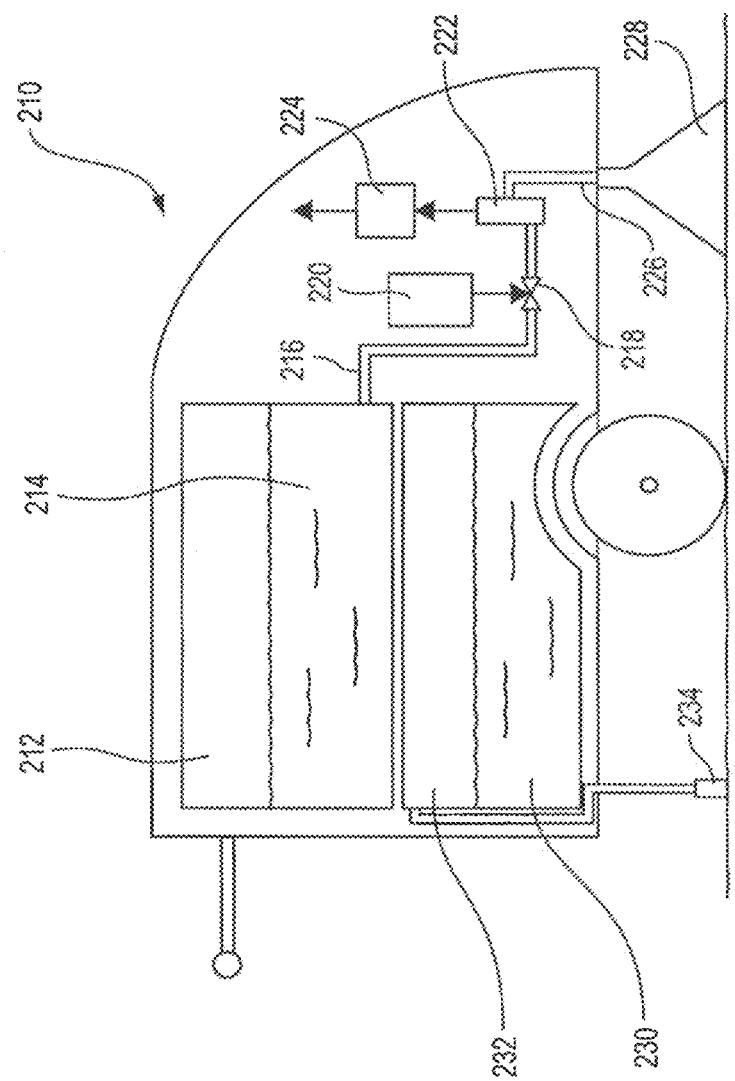
FIG. 6 is a cross-sectional view of a floor scrubber fitted with a holding tank-less ozonation system according to one embodiment of the present application.

One embodiment of a scrubber 210 is illustrated in FIG. 6. The scrubber 210 has a clean reservoir 212 holding water to be ozonated 214. The water to be ozonated 214 passes through inlet 216 in order to enter the ozonation flow path. The water flows at a desired flow rate through venturi 218. Venturi 218 mixes the water with ozone produced in ozone generator 220 to provide an ozone-water mixture, which flows through gas-liquid separator 222. The gas-liquid separator 222 separates the mixture into gaseous ozone and ozonated water. The gaseous ozone passes through ozone destructor 224 before being vented as oxygen. The ozonated water passes through outlet 226 as it leaves the ozonation flow path to be used by the scrubber as the cleaning solution. The scrubber 210 can include scrubbing brushes 228 which use the ozonated water to scrub the floor, resulting in dirty ozonated water. The dirty ozonated water 230 is sucked into dirty reservoir 232 via vacuum inlet 234.

In particular embodiments, the system can be adapted to interface with a commercially available scrubber or extractor. In such situations, it is desirable to ozonate water after it leaves the clean reservoir, instead of ozonating all of the water in the clean reservoir as a recirculating ozonating system would do. To achieve this, a system according to the present application can be installed downstream from the clean reservoir and upstream from the scrubbing brushes. Installing the system in a hose connecting the clean reservoir and scrubbing brushes allows the system to provide ozonated water on demand.

Ozonation.

In ozonation systems according to embodiments of the present application, since the ozonation flow path is non-recirculating, the liquid passes through the ozonation flow path only once before being dispensed from the liquid outlet. The ozonation flow path must, therefore, dissolve sufficient ozone in the liquid in a single pass to provide the ozonated liquid.

In particular embodiments of the ozonation system according to the present application, the liquid accepted by the ozonation flow path is substantially unozonated. "Substantially unozonated" is to be understood to mean that the accepted liquid does not exceed a threshold value. In particular embodiments, the threshold value can be an ORP value of about 250 millivolts (mV), preferably about 150 and more preferably about 50 mV. It is appreciated that the threshold value can alternatively be measured in ppm of dissolved ozone, and the threshold value can be about 0.1, preferably about 0.05, more preferably about 0.02 and even more preferably about 0.01 ppm of dissolved ozone. For example, an ozonation flow path according to the present application can take an accepted liquid having 0 ppm dissolved ozone and an ORP of 0 mV and, passing the fluid through the ozonation flow path only once, dispense an ozonated liquid having at least about 8 ppm ozone and/or an ORP due to the dissolved ozone of at least about 900 mV. A similar final amount of dissolved ozone and/or a final ORP value can be observed in the dispensed ozonated liquid when the accepted liquid already has a non-zero amount of dissolved ozone and/or a non-zero ORP.

It is appreciated that "ozonated liquid" can generally refer to liquid with any amount of ozone dissolved therein. However, in the context of the present application, when the liquid is water or a water-additive mixture, the term "ozonated liquid" is to be understood to be liquid that has sufficient ozone dissolved therein that the oxidation-reduction potential (ORP), solely due to the dissolved ozone, is at least about 450 mV.

In particular embodiments, the ORP solely due to the dissolved ozone is at least about 600, 750, 800, 850, 900, 950, 1000, 1050, 1100 or 1150 mV. It is appreciated that an alternative definition for "ozonated liquid" according to another embodiment is a liquid that has sufficient ozone dissolved therein to reach a concentration of at least 3 parts per million (ppm), and preferably at least 4, 5, 6, 7, 8, 9 or 10 ppm.

Oxidation-reduction potential is a measure of disinfectant levels in water systems, independent of the oxidant (e.g. ozone, chlorine, peroxide, peroxyacetic acid). It is generally accepted that liquids with ORP values of 650 to 700 mV kill bacteria within a few seconds. Yeast and other fungi can be killed with such a liquid upon contact for a few minutes. Liquids with an ORP value of 450 mV are termed "sanitizing liquids". Liquids with an ORP value of 600 mV are termed "disinfecting liquids". Liquids with an ORP value of 800 mV are termed "sterilizing liquids".

An ORP value "due solely to dissolved ozone" is to be understood to mean that the ORP is a measure of the oxidation potential of the dissolved ozone and does not take into account the oxidation and/or reduction potential of other additional components of the liquid. For example, chlorine dissolved in water has an oxidation potential. Adding ozone to the chlorinated water would increase the ORP. In this example, the ORP value "due solely to dissolved ozone" corresponds to the ORP value of the water if it was not chlorinated, regardless of the ORP value of the ozonated and chlorinated water.

In contrast to holding tank-less systems according to the present application, ozonation systems having a recirculating ozonation flow path only dissolve a small amount of ozone every time the liquid travels through the recirculating flow path. Repeatedly recirculating the liquid adds a small amount of ozone every time the liquid is recirculated, eventually resulting in a larger amount of dissolved ozone and higher ORP value.

Pressure.

Ozonation systems according to the present application can be connected to a municipal water supply. Typical municipal water supplies provide water at a pressure between approximately 20 psi and approximately 60 psi. An ozonation system according to the present application accepts water from the municipal water supply or from another water source (for example from a pressurized holding tank). In some instances, for example if water is accepted from a pressurized tank, water may be provided at pressures as high as 80 or 100 psi. In the embodiment shown in FIG. 1, the accepted water enters the liquid inlet 12 at the desired flow rate and accepted pressure and travels through the ozonation flow path, which does not include any pressure regulation systems, for example pressure reducing valves or pressure pumps. In an embodiment, the ozonated water dispensed from the system has a dispensing pressure that is directly dependent on the accepted pressure.

Flow Rate.

The accepted water flows into the liquid inlet of the ozonation flow at a desired flow rate, which is a function of the water pressure and cross-sectional area of the liquid inlet. The desired flow rate typically ranges from 3 to 10 liters per minute, but can be as high as about 38 liters per minute. In the embodiment shown in FIG. 1, the accepted water enters the liquid inlet 12 at the desired flow rate and accepted pressure and travels through the ozonation flow path. In an embodiment, the flow rate of the ozonated water dispensed from the system is the same as the flow rate accepted by the system.

Residence Time.

A system with a "holding tank" is to be understood to be a system with a reservoir, for example a vessel, tank, pipe, pool, drum or any other container, for storing, accumulating or saving liquid until it is needed. A systems that is "holding tank-less" is to be understood to be a system that does not store, accumulate or save liquid until it is needed. In such a holding tank-less system, liquid would be accepted into the system, flow through the flow path, and be dispensed from the system without being placed in a reservoir.

Since the ozonation flow path does not have a holding tank for producing ozonated liquid on a recirculating basis, the overall volume of the system is small in comparison to the flow rate of dispensed ozonated liquid. The ratio between volume and flow rate is understood to be a measure of the average fluid residence time of the liquid in the ozonation flow path.

The fluid residence time of a system is an expression of how long it takes a fluid element to move through a volume which is in equilibrium. It is to be understood that fluid residence time is a measure of the residence time of the liquid in that volume. It is the average time a fluid element spends within a specified region of space, such as a reservoir. In a well-mixed system with all fluid elements in equilibrium, residence time can be calculated by dividing the volume in question by the volumetric flow rate of the liquid. Embodiments of the present application have an average fluid residence time of the liquid in the ozonation flow path of less than about 5 minutes. In other particular embodiments, the average fluid residence time is less than about 1, about 0.7 or about 0.05 minutes.

In particular embodiments of the ozonation system according to the present application, the ozonation system has a liquid inlet and a liquid outlet, with the ozonation flow path therebetween. In other embodiments, the ozonation system according to the present application includes ozonation flow path with a liquid inlet and liquid outlet.

For example, in one embodiment, the liquid inlet can correspond to the nozzle which accepts liquid into the ozonation system and the fluid residence time is measured from the nozzle to the liquid outlet which dispenses ozonated liquid from the ozonation system. In another particular embodiment, the liquid inlet corresponds to the liquid-gas mixer and the fluid residence time is measured from the liquid-gas mixer to the liquid outlet which dispenses ozonated liquid from the ozonation system.

In one particular embodiment of an ozonation flow path according to the present application, a venturi mixer is joined to a gas-liquid separator by 3" of ⅜" tubing. In such an embodiment, and at average flow rates, the average residence time between the venturi mixer and the gas-liquid separator is in the range of about 0.01 and about 0.1 seconds. In such an embodiment, the average residence time in the ozonation flow path can be less than about 0.7 or less than about 0.05 minutes, depending on the flow rate of the liquid.

Cartridge and Usage Tracking.

As discussed, water ozonation devices (such as a holding tank-less water ozonation system of the present application) can optionally use a removable filter cartridge when the ozonation device includes an ozone source such as, for example, a corona discharge system. The removable filter cartridge can be used to increase the concentration of ozone generated by the corona discharge system by reducing the amount of moisture in the provided air and/or increasing the concentration of oxygen (for example by removing nitrogen) in the air provided to the corona discharge system.

The cartridge can be arranged for integration and use with first and second ozonation devices, and can include a usage counter to increment a usage count in response to a received signal from an ozonation device, and a device interface to provide an expiry indication when the cartridge is no longer suitable for use. The devices count usage can be based on different first and second cycle count conditions. The same cartridge can be used in different devices, such as, for example, a consumer water ozonation device (such as described in U.S. Pat. No. 6,964,739, incorporated herein by reference), a high capacity commercial water ozonation device, a large volume ozone sprayer, a holding tank-less water ozonation device, etc. The devices can include logic to disable usage of the system after the cartridge has reached a predetermined usage condition. Compatibility identifiers can be used in the cartridge and devices to restrict use of the cartridge with certain devices.

While some known systems offer a limited type of usage tracking or counting, embodiments of the present application count usage of a cartridge in a way that permits the cartridge to be used, and re-used, in systems having a different type, or which measure usage cycles differently. This can be described as providing universal usage counting in a water treatment system having a plurality of ozonation devices which count usage according to different cycle completion conditions.

In an embodiment, the present application provides a cartridge-enhanced water treatment system including a cartridge and first and second ozonation devices. The first and second ozonation devices can be the same or different. For example, the first and second ozonation devices can be first and second holding tank-less ozonation devices; or the first ozonation device can be a holding tank-less ozonation device and the second ozonation device can be a residential ozonation device (such as described in United States Patent Application Publication No. US-2008-0190825-A1).

The first ozonation device is of a first type, and includes a first device cycle count manager configured to signal the cartridge upon completion of an ozonation cycle of the first ozonation device with respect to a first ozonation device cycle count condition. The second ozonation device is of a second type, the second type being different from the first type. The second ozonation device includes a second device cycle count manager configured to signal the cartridge upon completion of an ozonation cycle of the second ozonation device with respect to a second ozonation device cycle count condition.

In one embodiment, the cartridge is a desiccant cartridge, is arranged for integration and independent use with both the first ozonation device and the second ozonation device, and includes: an air inlet to receive atmospheric air, a desiccant material to remove moisture, and a dry air outlet for interfacing with one of the first and second ozonation devices to provide dry air to an ozone generator. In another embodiment, the cartridge is a nitrogen-removing cartridge, is arranged for integration and independent use with both the first ozonation device and the second ozonation device, and includes: an air inlet to receive atmospheric air, a material to remove nitrogen gas from the air so as to increase the concentration of oxygen in the air, and an oxygen-enriched air outlet for interfacing with one of the first and second ozonation devices to provide oxygen-enriched air to an ozone generator. In yet another embodiment, the cartridge is both a nitrogen-removing and desiccant cartridge, and includes both a desiccant material to remove moisture and a material to remove nitrogen gas from the received air.

The cartridge further includes a usage counter arranged to modify a stored usage count in response to receipt of a signal from the first or second cycle count manager, and a device interface arranged to provide an expiry indication indicating that the cartridge is no longer suitable for further use, based on the stored usage count. The cartridge can optionally include a chronological counter arranged to modify a stored time count. The device interface in such a cartridge can provide an expiry indication based on the stored usage count or the stored time count. In a cartridge that includes a chronological counter, the cartridge could be stored in a vacuum packed container and, once the container is opened and the cartridge exposed to atmospheric air, the chronological counter could be started by the removal of a tab. Removal of the tab could, for example, engage a battery with dedicated circuitry for modifying the stored time count.

The first and/or second cycle count managers can comprise a cycle memory arranged to keep track of partially completed cycles.

In an example, the cartridge includes a cartridge compatibility identifier, and the first and second ozonation devices include first and second device compatibility identifiers, respectively. First and second device compatibility managers are arranged to determine whether the cartridge is compatible with the first or second ozonation device, respectively, based on a comparison of the cartridge compatibility identifier with the first and second device compatibility identifiers, respectively.

The first and second device compatibility managers can determine that the cartridge is compatible with the first or second ozonation device when the cartridge compatibility identifier is the same as the first or second ozonation device compatibility identifier, respectively. Therefore, in an example, if the cartridge is compatible with the first and second ozonation devices, all three have the same compatibility identifier.

The first and second device compatibility managers can determine that the cartridge is compatible with the first or second ozonation device when the first or second ozonation device compatibility identifier identifies a device class with which the cartridge compatibility identifier is compatible. The cartridge can then be compatible with a plurality of types of ozonation device of the identified device class.

The usage counter (with the optional chronological counter) in the cartridge can be reset in response to receipt of a usage and/or chronological counter reset signal. The system can further include a usage counter reset manager (with an optional chronological counter reset manager), in communication with the cartridge, arranged to send a usage and/or chronological counter reset signal to reset the usage and/or chronological counter in the cartridge. The usage counter reset manager and/or chronological counter reset manager can be arranged to determine an expected life of a dried desiccant material and/or a nitrogen-removing material prior to sending the usage and/or chronological counter reset signal. The usage and/or chronological counter reset managers can be arranged to provide a modified value with which the usage and/or chronological counters can be reset, the modified value being based on measured properties of the desiccant material and/or the nitrogen-removing material.

In another embodiment, the present invention provides a cartridge arranged for integration and use with first and second ozonation devices of different types, and including: an air inlet to receive atmospheric air; a desiccant and/or nitrogen removing material to remove moisture and/or nitrogen; an air outlet for interfacing with one of the first and second ozonation devices to provide dry and/or oxygen enriched air to an ozone generator; and a usage and/or chronological counter. The usage counter (with an optional chronological counter) is arranged to modify a stored usage count in response to receipt of a first cycle completion signal received from the first ozonation device representing completion of an ozonation cycle with respect to a first ozonation device cycle count condition. The usage counter is also arranged to modify the stored usage count in response to receipt of a second cycle completion signal received from the second ozonation device representing completion of an ozonation cycle with respect to a second ozonation device cycle count condition. The cartridge also includes a device interface arranged to provide an expiry indication indicating that the cartridge is no longer suitable for further use based on the stored usage count. In cartridges with the optional chronological counter, the chronological counter is arranged to modify a stored time count. The device interface in such a cartridge can provide an expiry indication based on the stored usage count or the stored time count. In a cartridge that includes a chronological counter, the cartridge could be stored in a vacuum packed container and, once the container is opened and the cartridge exposed to atmospheric air, the chronological counter could be started by the removal of a tab. Removal of the tab could, for example, engage a battery with dedicated circuitry for modifying the stored time count.

Figure 7:
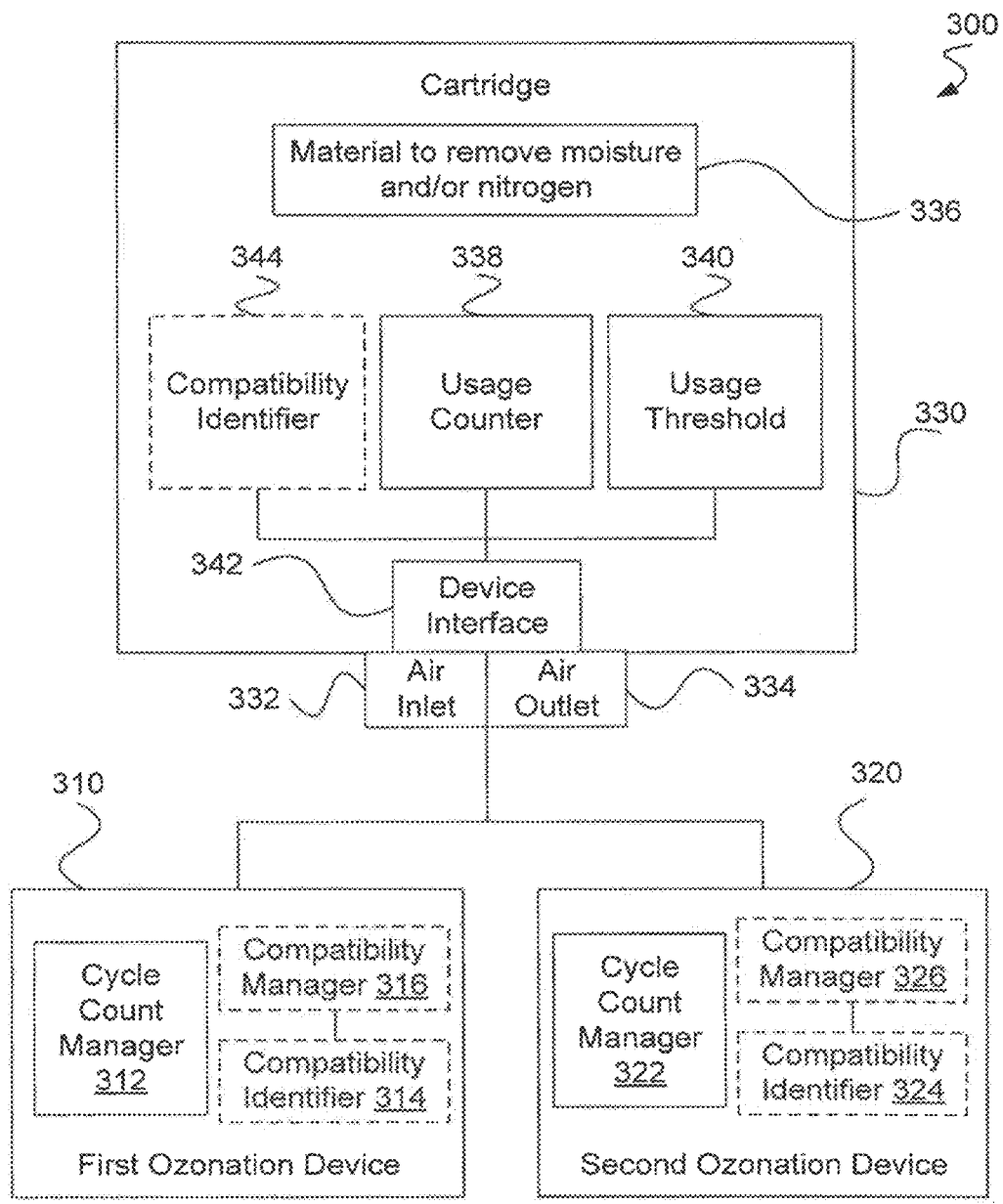
FIG. 7 is a block diagram of a cartridge-enhanced water treatment system including a first ozonation device, a second ozonation device, and a cartridge arranged to interface with the first and second ozonation devices according to an embodiment of the present application.

FIG. 7 is a block diagram of a cartridge-enhanced water treatment system 300 including a first ozonation device 310, a second ozonation device 320 and a cartridge 330. The first ozonation device 310 includes a cycle count manager 312, and optionally includes a compatibility identifier 314, and a compatibility manager 316.

The cycle count manager 312 is configured to signal the cartridge 330 upon completion of an ozonation cycle of the first ozonation device 310. The cycle count manager 312 is particularly configured with respect to a first ozonation device cycle count condition, such as a cycle count threshold. For example, if the first ozonation device 310 is a high capacity ozonation device or system, the cycle count manager 312 can be configured to signal the cartridge 330 after 45 seconds of operation. In this case, the first ozonation device cycle count condition, or threshold, is 45 seconds of operation.

The cycle count manager 312 can include a cycle memory, to keep track of partially completed cycles. For example, suppose an ozonation device has a cycle count threshold of 45 seconds. If the ozonation device runs for 30 seconds and the device is stopped, the cycle count manager memory will store the partially completed cycle information. When the ozonation device next starts, it calculates after 15 seconds of operation that a cycle has been completed, based on the partially completed cycle information.

In an embodiment, the cycle count manager 312 maintains the cycle memory value when the cartridge is removed from a first ozonation device of a first type and is installed in a second ozonation device of the same type. For example, if the two ozonation devices use the same ozonation device cycle count condition, the cycle memory value is maintained. If the cartridge is subsequently installed on an ozonation device of a different type, or which uses a different ozonation device cycle count condition, the cycle memory can be converted based on a relationship between the two conditions, or can be cleared if such conversion cannot be completed.

The compatibility identifier 314 is an identifier that can be used within a cartridge-enhanced water treatment system to identify compatible cartridges and water ozonation devices. The identifier 314 can also be referred to as a first device compatibility identifier.

The compatibility manager 316 determines whether a cartridge is compatible with the first ozonation device based on stored compatibility identifiers. The compatibility manager 316 can determine that the cartridge is compatible if it has the same compatibility identifier as the first ozonation device. Alternatively, a positive determination can be made if the cartridge and device compatibility identifiers have another predetermined relationship with each other, for example are the opposite of each other.

The second ozonation device 320 also includes a cycle count manager 322, and optionally a compatibility identifier 324 and compatibility manager 326, which are similar to the above-described cycle count manager 112, compatibility identifier 314, and compatibility manager 316. The cycle count manager 322 is configured to signal the cartridge 330 upon completion of an ozonation cycle of the second ozonation device 320.

The cycle count manager 322 is particularly configured with respect to a second ozonation device cycle count condition. For example, suppose the second ozonation device 320 is a low capacity commercial ozonation device capable of performing two or more different ozonation cycles, associated with different types of container or attachment used. The second ozonation device cycle count condition can then be different depending on the selected ozonation cycle.

For example, a second ozonation device cycle count condition for a vegetable bowl cycle can include achieving a desired ozone concentration in the water during a running time of about 3 to 4 minutes. In that case, the second ozonation device cycle count condition can be dependent on a detection of an ozone concentration in the water, as compared to a desired ozone concentration for a particular cycle, and optionally within an operation time window. Regardless of the potential variation in the actual time taken to complete the cycle, the cycle count manager 326 can be configured to signal the cartridge 330 after meeting one or more conditions to satisfy completion of a second ozonation device cycle.

In an embodiment, if the first and second ozonation device compatibility identifiers 314 and 324 are the same, then this signifies that a cartridge having that compatibility identifier will work and be compatible with both the first and second ozonation devices 310 and 320.

The cartridge 330 includes an air inlet 332, an air outlet 334, and houses at least one material 336 to remove moisture and/or nitrogen. The cartridge is arranged for integration and use with the first ozonation device with the second ozonation device. The air inlet 332 is to receive atmospheric air, and the air outlet 334 is for interfacing with one of the first and second ozonation devices to provide dry and/or oxygen-enriched air to an ozone generator.

The cartridge 330 includes a usage counter 338, a stored usage threshold 340, and includes a device interface 342. The usage counter 338 modifies a stored usage count in response to receipt of a signal from the cycle count manager 316 or 326. The modification of the usage count can include incrementing or decrementing the count, depending on the implementation of the counter. The usage counter 338 can be implemented in a flash memory, or other computer-readable memory or computer-readable medium.

The usage threshold 340 is stored in a memory in the cartridge 330. The cartridge usage threshold 340 can be programmable, so that a manufacturer can program different thresholds for different cartridges. The programmability of the cartridge cycle threshold differs from other known cartridges with fixed counts. For instance, certain customers want to change the cartridge after 650 cycles based on their usage conditions and requirements, and others want to change after 800 cycles based on different usage conditions and requirements.

For example, with a commercial ozonation device including a trigger sprayer, 650 cycles can be run before the cartridge is marked as expired. The trigger sprayer sends a signal to the cartridge to remove a cycle every time the system is run. With a high capacity ozonation device, the cartridge lasts for 1,200 gallons. Typical flow can be about 2.5 gallons/minute. A cycle can be removed from the cartridge every 45 seconds. The cartridge itself receives a signal (in both cases) to remove a cycle from its count. Each system in turn uses different parameters to determine when to send this cycle completion signal.

In an embodiment, if the usage count stored in the usage counter 338 exceeds the stored usage threshold, the cartridge can provide an expiry indication to the device interface 342, indicating that cartridge is no longer suitable for further use. The device interface 342 can provide the expiry indication in a format readable by the ozonation device in which the cartridge is used. In an embodiment, the expiry indication is a separate indication provided to, and stored in, the device interface 342.

In another embodiment, the usage count begins at the maximum capacity value, and is decremented until it reaches zero. In this case, the first and second ozonation devices signal the cartridge to decrease, or decrement, the usage count by one upon completion of an ozonation device cycle count condition. The providing of a usage count of zero can be an embodiment of providing an expiry indication to the device interface 342.

In another example, the usage counter increments upon cycle completion. If the usage count exceeds the usage threshold, the cartridge can change the usage counter to read "999" or some other value that indicates to the compatibility manager that the cartridge is not to be used.

In another embodiment, the usage counter 338 can be reset, and the desiccant material 336 in the cartridge 330 can be dried, thus permitting re-use and recycling of the cartridge. In an example, the usage counter 338 can be reset in response to receipt of a usage counter reset signal. The usage counter reset signal can be received from an ozonation device with which the cartridge is to be used, or from another specialized device including dedicated circuitry to reset the cartridge.

The ozonation device or the specialized device can comprise a usage counter reset manager, in electrical communication with the device interface 342 of the cartridge when the cartridge is in use or is in place for usage counter resetting. The usage counter reset signal can be issued after a determination has been made that the desiccant material has been sufficiently dried for re-use. Optionally, the usage counter reset manager can determine an expected life of the dried desiccant material. The usage counter reset manager can provide a modified value with which the usage counter can be reset, the modified value being based on measured properties of the desiccant material.

An advantage of providing the usage counter reset manager as part of a specialized device, such as a usage counter resetting apparatus, is to remove the ability of users of the ozonation devices to reset the usage counter. In an example where the usage counter reset manager is provided in the ozonation device, an access controller can be provided to restrict access to the usage counter reset manager. The access controller can be implemented as any mechanical and/or electrical form of access control, such as a physical key, a security card access control, a biometric identifier, etc.

The cartridge 330 optionally includes a compatibility identifier 344, also referred to as a cartridge compatibility identifier 344. Based on a comparison between the cartridge compatibility identifier and the first or second ozonation device compatibility identifier, a determination is made whether the cartridge is compatible with the device. For example, if the cartridge compatibility identifier 344 is the same as the first or second compatibility identifiers 314 and 324, then that cartridge is activated or enabled for use with the first or second ozonation devices, respectively.

In an embodiment, the compatibility identifiers 314, 324 and 344 can each be stored as a line of code in a memory provided in the first and second ozonation devices 310 and 320, and the cartridge 330, respectively. If the stored cartridge and device compatibility identifiers correspond, or are the same, then the water ozonation device permits use of the cartridge in the device. This permits a manufacturer to identify or encode cartridges for use only with apparatuses produced by a particular distributor or for a particular reseller. The cartridge can be used with water ozonation devices of different types, for example low capacity and high capacity commercial devices, as long as the devices have the same identifier as the cartridge.

Embodiments have been described herein with respect to different types of commercial ozonation devices and systems. Such commercial devices can include a commercial floor scrubber, or a carpet extractor, equipped with a liquid ozonation device as described herein. In other embodiments, the features described herein can be incorporated in other classes of ozonation devices or systems, such as industrial or consumer ozonation devices. In such embodiments, the compatibility identifier can be used to ensure that a cartridge is compatible only with different types of ozonation devices of the same class. For example, a consumer compatibility identifier, commercial compatibility identifier, or industrial compatibility identifier can be included in cartridges to be used with one of those classes of ozonation devices having the same, or a corresponding, compatibility identifier.

The cartridge-enhanced water treatment system 300 can include logic to disable usage of an ozonation device after the cartridge has reached a predetermined usage and/or chronological condition or threshold. This condition may be different depending on the type of ozonation device in which the cartridge is used. The logic can be provided in the first and second ozonation devices 310 and 320, and/or in the cartridge 330.

For example, when a cartridge is inserted and an ozonation device is turned on, a base unit of the ozonation device can read the cartridge identifier and check to make sure that the code matches what has been preprogrammed on the control board in the base unit, or otherwise results in a positive compatibility determination. If it does not, then the unit will not run. A similar methodology can apply with respect to reading the usage and/or chronological count, and not permitting the device to operate when the usage or chronological count exceeds the programmed threshold.

Figure 8A:
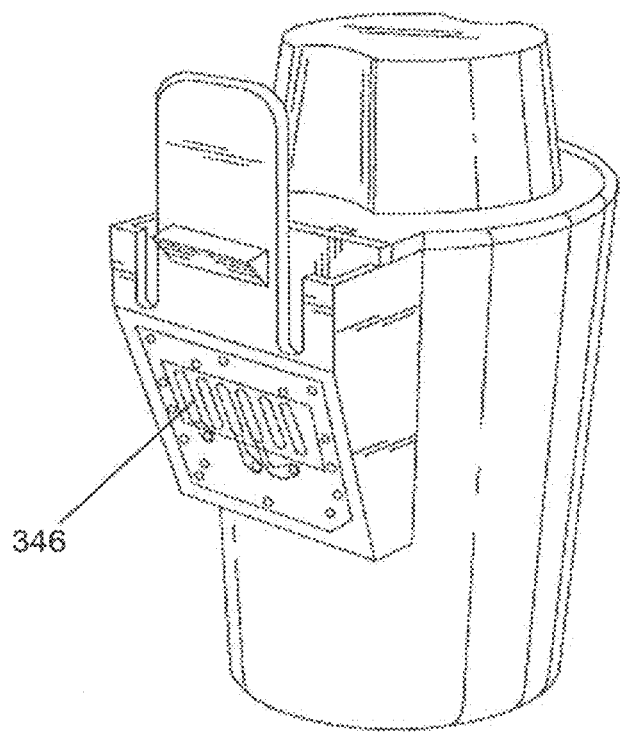
FIG. 8A is a top front right perspective view of a cartridge according to an embodiment of the present application.
Figure 8B:
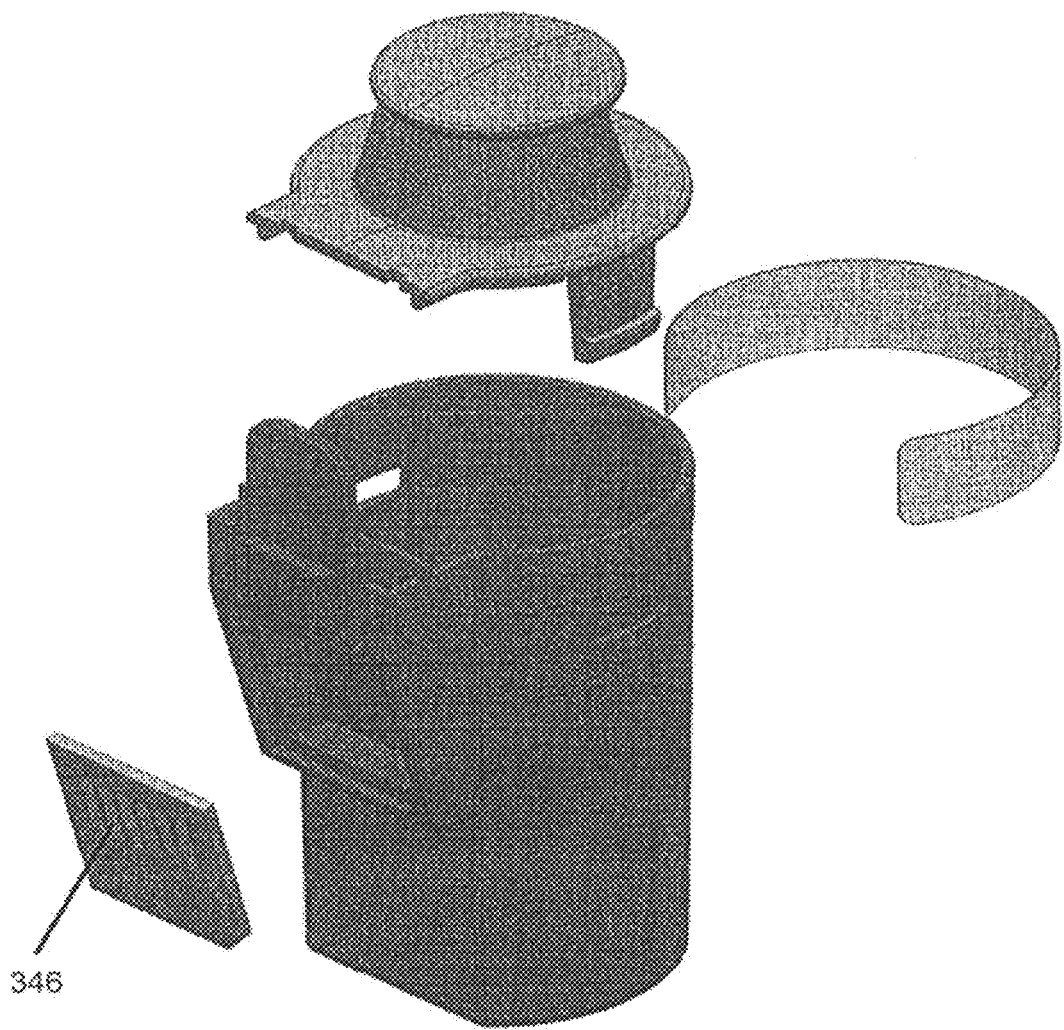
FIG. 8B is an exploded, top front right, perspective view of a cartridge according to an embodiment of the present application.

FIG. 8A is a front right perspective view of a cartridge according to an embodiment of the present application. In an embodiment, the usage counter 338, the usage threshold 340, and the optional compatibility identifier 344 are in electrical communication with the device interface 342, such as wired communication, wireless communication, or infrared (IR) communication. In the embodiment of FIG. 8A, one, some, or all of the usage counter 338, the usage threshold 340, the optional compatibility identifier 342, and the device interface 344 can all be provided in a printed circuit 346 provided on an outer surface of the cartridge, which mates with the ozonation device. FIG. 8B shows an exploded view of a cartridge according to an embodiment of the present application. In this embodiment, the printed circuit 346 can include the features noted above with respect to the embodiment of FIG. 8A and the cartridge can be disassembled and the desiccant material, the nitrogen removing material and/or the battery for powering the printed circuit 346 can be replaced.

Figure 9:
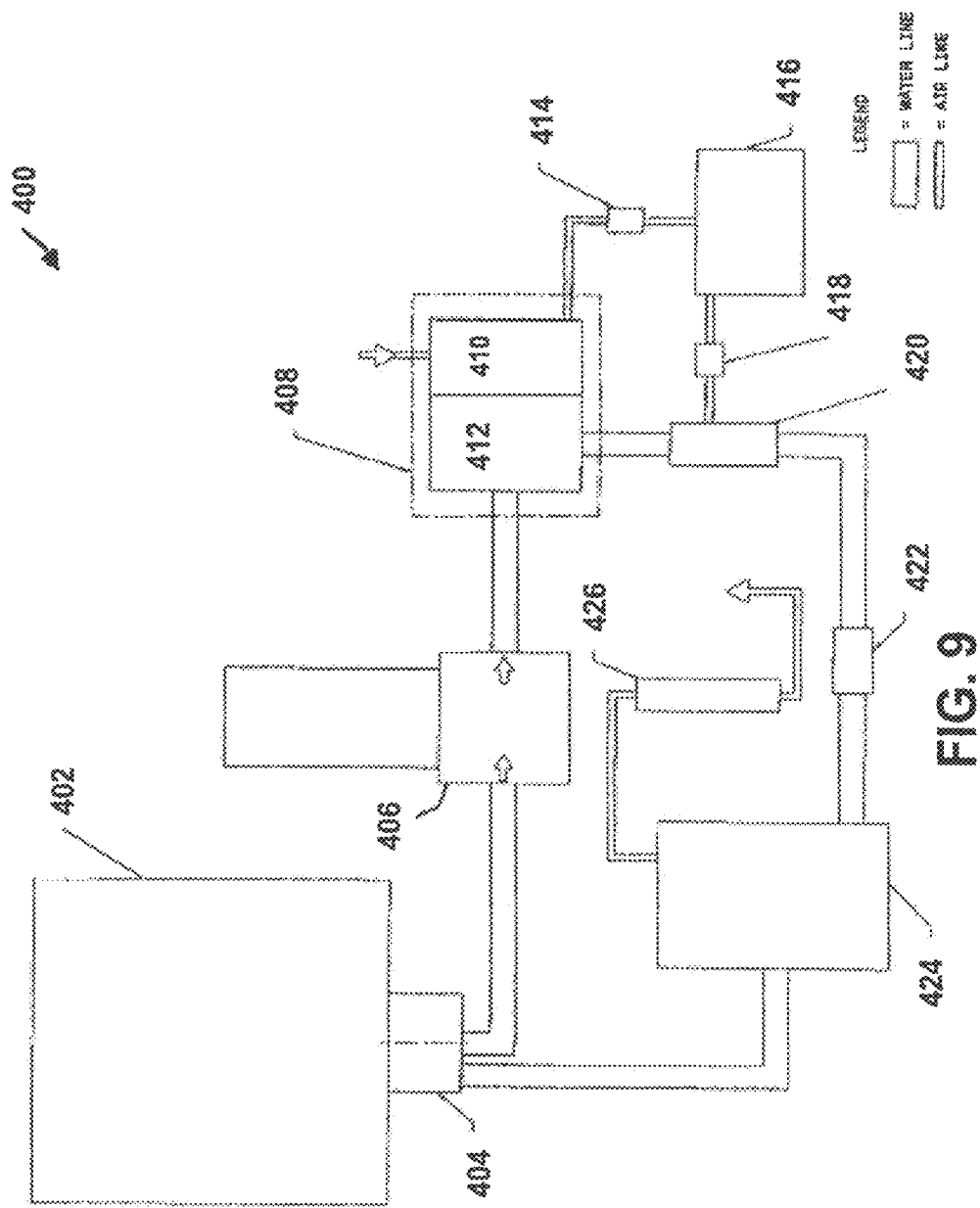
FIG. 9 is a mechanical system diagram of an exemplary water ozonation system with which a cartridge according to an embodiment of the present application can be used.

FIG. 9 is a mechanical system diagram of an exemplary water sanitization system with which a cartridge according to an embodiment of the present application can be used. The system illustrated in FIG. 9 shows both water and air paths, and illustrates a filter that can perform air dryer and water filtration. This system is described herein for illustration, as a background for understanding the operational environments of the present application. Another exemplary water sanitization system with which a cartridge according to an embodiment of the present application could be used is the system illustrated in FIG. 1, where the cartridge can be used with ozone generator 16. Ozone generator 16 of FIG. 1 and ozone generator 416 of FIG. 9, discussed below, can be used interchangeably.

While the embodiments above have described a cartridge which can perform air drying, such functionality can be provided in a removable filter cartridge that also provides water filtration. In discussions of FIG. 9, the terms "after" and "before" are used with respect to the water or air flow within the system. The direction of water flow is illustrated at pump motor 406, whereas the direction of air flow is illustrated at air dryer 410.

A reservoir 402 is provided for containing water that is to be, or is being, sanitized/purified. The reservoir 402 is a removable water container. Examples of such containers are discussed in commonly assigned International Patent Application No. WO 2004/113232, published on Dec. 29, 2004, which is incorporated herein by reference. A fluid transfer port or valve 404 is provided at the interface of the reservoir 402 with a base unit incorporating the other elements of the system according to an embodiment of the present invention. The fluid transfer valve 404, or fluid control port or liquid interface, allows the control of fluids, and in particular, but not limited to, the control of fluids into and out of the container, which allows the container to be removed without leaking.

The flow into and out of the container may occur simultaneously or sequentially. In the case of simultaneous outflow and inflow, water is taken from the reservoir 402, processed, and pumped back to the reservoir. This is preferably done in such a way that the fluid level in the reservoir is maintained during processing (i.e. the fluid is not drained from the reservoir, processed and then pumped back into the reservoir). The fluid transfer valve 404 can be implemented in any number of ways, such as by way of separate check valves for inflow and outflow, or a single double check valve (DCV) for both inflow and outflow. The double check valve arrangement allows water to flow out of and into the container simultaneously while using a single connection point.

In order to improve mixing, a DCV cap (not shown in the figures) can be provided at the fluid transfer valve when it is implemented as a double check valve. An angled section of the DCV cap can preferably be removed to allow the water entering the reservoir from the base unit to be less impeded and therefore faster moving. This faster moving water causes greater mixing in the reservoir and means the dissolved ozone level gets up higher and faster in the reservoir.

Water flows from the reservoir 402, through the fluid transfer valve 404 to a pump motor 406 provided after the reservoir 402 to draw water from the reservoir. Although the pump head and motor functions can be separated, they are typically implemented in a unitary motor/pump assembly, such as the pump motor 406, and will be discussed as such herein, keeping in mind that other implementations are possible. The electronics are typically connected to the motor portion, but the pump and motor are interconnected.

A replaceable cartridge 408, which is removable and preferably disposable, is provided. The cartridge 408 can include an air dryer 410 for function in the air flow path, or air line, of the system and/or a water filter 412 for function in the water flow path, or water line, of the system. In terms of air circulation in the system, air typically is drawn in from the atmosphere via the air dryer 410, and can then pass through an inlet valve 414, an ozone generator 416, an outlet valve 418, and an ozone contacting device, or mixing device, 420, such as a venturi.

The inlet and outlet valves 414 and 418, alternatively referred to as transfer ports, are optional components of the system and can be implemented as check valves. They serve to improve performance of the system, and particularly the ozone generator 416. The valves 414 and 418 co-operate to ensure that when the unit is not running, little or no residual ozone gas can diffuse out of the system to atmosphere. Some governmental safety guidelines and regulations include a virtual no ozone gas emissions requirement. The valves 414 and 418 assist in achieving such requirements. The outlet valve 418 prevents water from backing up into the ozone generator 416 via the ozone contacting device 420 when the unit is at rest with a reservoir, or attachment, on it.

The ozone generator 416, which can be a corona-discharge type, converts a portion of the oxygen in the air (drawn from the atmosphere) into ozone. The ozone is mixed with the water in the ozone contacting device 420. The water ozone mixture then preferably passes through an ozone gas atomizer 422 before passing into an off-gas unit 424, which removes the air and undissolved ozone. The removed gas is directed to an ozone destructor 426, which converts ozone into oxygen and safely releases it into the atmosphere.

The ozone gas atomizer 422 is provided downstream of the ozone contacting device 420 and just before the inlet port of the off-gas unit 424 in order to increase the contact time between the micro bubbles of ozone gas and the water. The geometry of a preferably necked down inlet port of the off-gas and the cyclonic action of the gas/liquid mixture in the off-gas unit 424 makes the off-gas unit 424 also act as a mixing device. This feature can significantly increase the dissolved ozone level in the water. An accumulator (not shown in the figures) can preferably be provided at the top of the off-gas unit 424 that captures excess water that escapes out of the off-gas unit 424 via the gas line. This accumulator can drain the excess water back into the off-gas unit 424 when the unit is at rest. Having this accumulator prevents water from getting into ozone destructor 426 when the unit is inverted. If the ozone destructor 426 (such as provided by CARULITE®) gets wet, it is rendered ineffective at destroying ozone gas.

A sealing check valve (not shown in the figures) can preferably be provided between the off-gas unit 424 and the ozone destructor 426. This sealing check valve seals the system from atmosphere in such a way that when the unit is inverted in an attempt to drain water out of it, water is prevented from leaving the system. It is the same principle as inserting a straw in a drink, covering the end of the straw and then removing the straw—the drink stays trapped in the straw. This is advantageous in a unit according to an embodiment of the present invention as it can keep all components wet and the pump primed.

As described earlier with respect to FIG. 9, embodiments of the present application include a removable filter cartridge provided in a base unit of a water sanitization system. The removable filter cartridge 408 can include an air dryer 410 and optionally a water filter 412. In other embodiments, the removable filter cartridge 408 can include a nitrogen remover and optionally a water filter 412. In yet other embodiments, the removable filter cartridge 408 can include both an air dryer 410 and a nitrogen remover, and can optionally include a water filter 412. As mentioned earlier, the present invention takes advantage of the fact that dry air and/or oxygen-enriched air reacts better in an ozone generator, yielding better ozone concentration output, which in turn results in a better "kill rate" with respect to bacteria when ozonated water is applied to food, items or surfaces.

In an embodiment, the removable filter cartridge includes an air dryer 410 and does not include a water filter. The air dryer 410 comprises a desiccant material that removes moisture from air.

The air dryer 410 can be placed anywhere in the base unit as long as it is before the ozone generator 416 and the ozone contacting device 420 with respect to air flow. The ozone contacting device 420 draws air from the atmosphere into the air dryer 410 and then into the ozone generator 416. Dry air can achieve much higher concentrations of ozone gas than humid air in a corona discharge ozone generator. As such, embodiments of the present invention provide a significant increase to the concentration of dissolved ozone in the water. An examination of experimental test results shows an increase in ozone concentration from approximately 1 ppm without the air dryer to over 3.5 ppm with the air dryer.

Although FIG. 9 illustrates an embodiment where fluid is recirculated (i.e. transported from a reservoir, to an ozone contacting device and returned to the reservoir), a cartridge according to the present application could also be used in a non-recirculation system. In a non-recirculating system, a fluid is transported from a fluid source to an ozone contacting device and then discharged as a sanitizing ozonated fluid. Since an ozone generator, which provides ozone to the ozone contacting device, yields better ozone concentration output from dry and/or oxygen enriched air, it may be beneficial to use a cartridge according to the present application to dry and/or remove nitrogen from the air used by the ozone generator.

Figure 10:
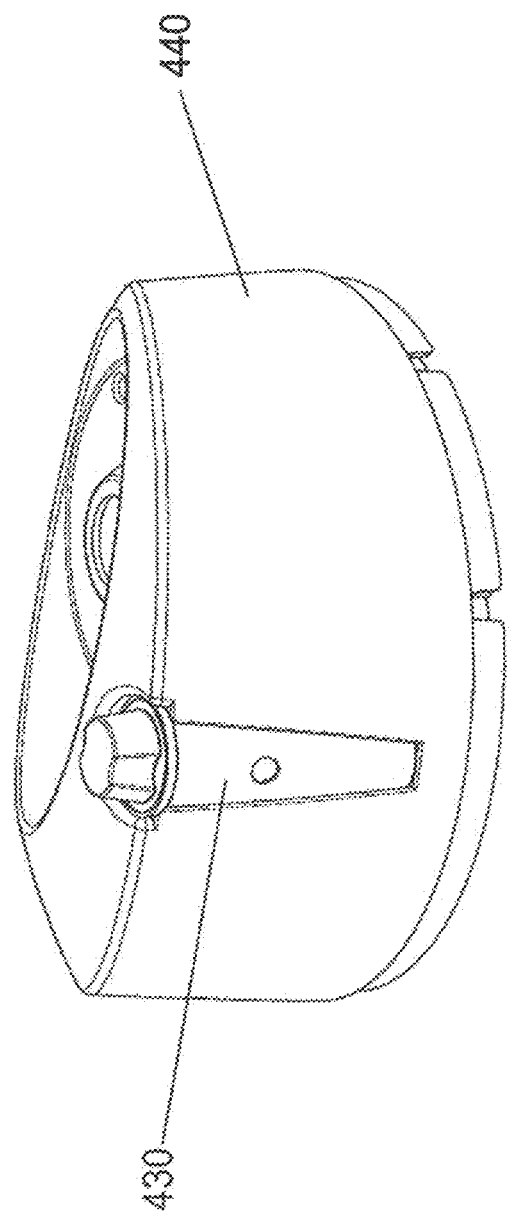
FIG. 10 is a back perspective view of a removable cartridge installed in a base unit of a water ozonation device according to an embodiment of the present application.

FIG. 10 is a back perspective view of a removable air dryer cartridge 430 installed in a base unit 440 of a water ozonation device according to an embodiment of the present invention. The removable air dyer cartridge 430 is a particular embodiment of the removable cartridge 408 having an air dryer and no water filter, and also having features specific to its use and interconnection with a base unit.

Secondary Flow Path:

In some implementations of a tankless ozonation system, it is advantageous to provide, for a system user, the ability to provide liquid with different concentrations of dissolved ozone without changing components of the system. In some embodiments, the system produces liquid with higher levels of dissolved ozone at lower flow rates. Such a system may be used to fill a small volume container (for example a bottle) or a large volume container (for example a bucket) from same machine without changing components of the system. Such exemplary systems may include outputs that are adapted to applications using a small volume container, and applications using a large volume container.

Examples of a small volume container include a bottle, such as a spray bottle, atomizer, or any other handheld apparatus or device. Examples of a large volume container include a bucket, or a reservoir or holding tank for a floor scrubber, carpet extractor or other equipment that uses a holding tank. In an example embodiment the large volume container is removable from the apparatus with which it is associated to enable the filling thereof with the ozonated liquid. In another example embodiment, the tankless ozonation system is provided on-board the apparatus with which the large volume container is associated, and the large volume container is filled with ozonated liquid without removing the container from the apparatus.

Embodiments of the present application advantageously provide a system having two flow paths, where the second flow path produces a liquid at a lower flow rate and with a higher concentration of ozone than the first flow path. The two flow paths have liquid-gas mixers of different sizes. The second flow path includes a smaller liquid-gas mixer than the first flow path. When the liquid-gas mixers are venturis, a smaller venturi has a smaller narrow waist section than a larger venturi. This smaller waist section has a smaller cross-sectional area and the liquid may flow through the smaller venturi at a lower flow rate. Flowing the liquid through at a lower flow rate is believed to draw in more ozone per unit volume of liquid than flowing the liquid through a larger venturi, which has a higher flow rate, thereby resulting in a liquid with a higher ozone concentration. Selecting the diameter of the narrow waist section (and, accordingly, the cross-sectional area) of the venturi allows one to select the amount of ozone dissolved in the liquid.

In an example embodiment, liquid provided at the output of the secondary flow path has an ozone concentration of 6 ppm, while liquid provided at the output of the primary flow path has an ozone concentration of about 1.5 ppm. In another example embodiment, in which an $O_2$ generator is used to provide oxygen to the ozone generator, ozonated liquid provided at the output of the secondary flow path has an ozone concentration of 10 ppm, while ozonated liquid provided at the output of the primary flow path has an ozone concentration of about 5 ppm.

Since the amount of dissolved ozone in the liquid produced by the secondary flow path is greater than the amount of dissolved ozone in the liquid produced by the primary flow path, the ozone level in the liquid produced by the secondary flow path may result in a liquid with greater than 0.3 ppm ozone for a longer period of time than the ozone level in the liquid from the primary flow path. An aqueous liquid with more than 0.3 ppm dissolved ozone has an ORP of greater than 750 mV, which may be considered a disinfecting liquid.

Aspects of a flow path may be modified once the size of the liquid-gas mixer is established. For example, the diameter of tubing in the flow path may be selected to provide sufficient liquid to the liquid-gas mixer. In other examples, the components downstream of the liquid-gas mixer are sized to not exert so much back pressure on the liquid-gas mixer that the liquid-gas mixer is prevented from properly operating.

The primary and secondary flow paths may, independently, include an ozone stabilizer to extend the half-life of the dissolved ozone.

In exemplary embodiments, the two flow paths use some components in common. For example, the two flow paths may both use a single ozone generator. When the ozone generator is a corona discharge ozone generator, the concentration of generated ozone in the gas entering the liquid-gas mixer is dependent on the flow rate of gas through the corona discharge. Accordingly, the flow path with the smaller liquid-gas mixer draws gas through the corona discharge at a lower rate and results in a gas with a higher concentration of ozone. This higher concentration of ozone may be another factor which increases the amount of dissolved ozone in the flow path having a smaller liquid-gas mixer. This is in contrast to current approaches, according to which users desiring both high and low flow outputs would need to install two separate ozonation systems and switch them out based on the desired use.

Figure 11:
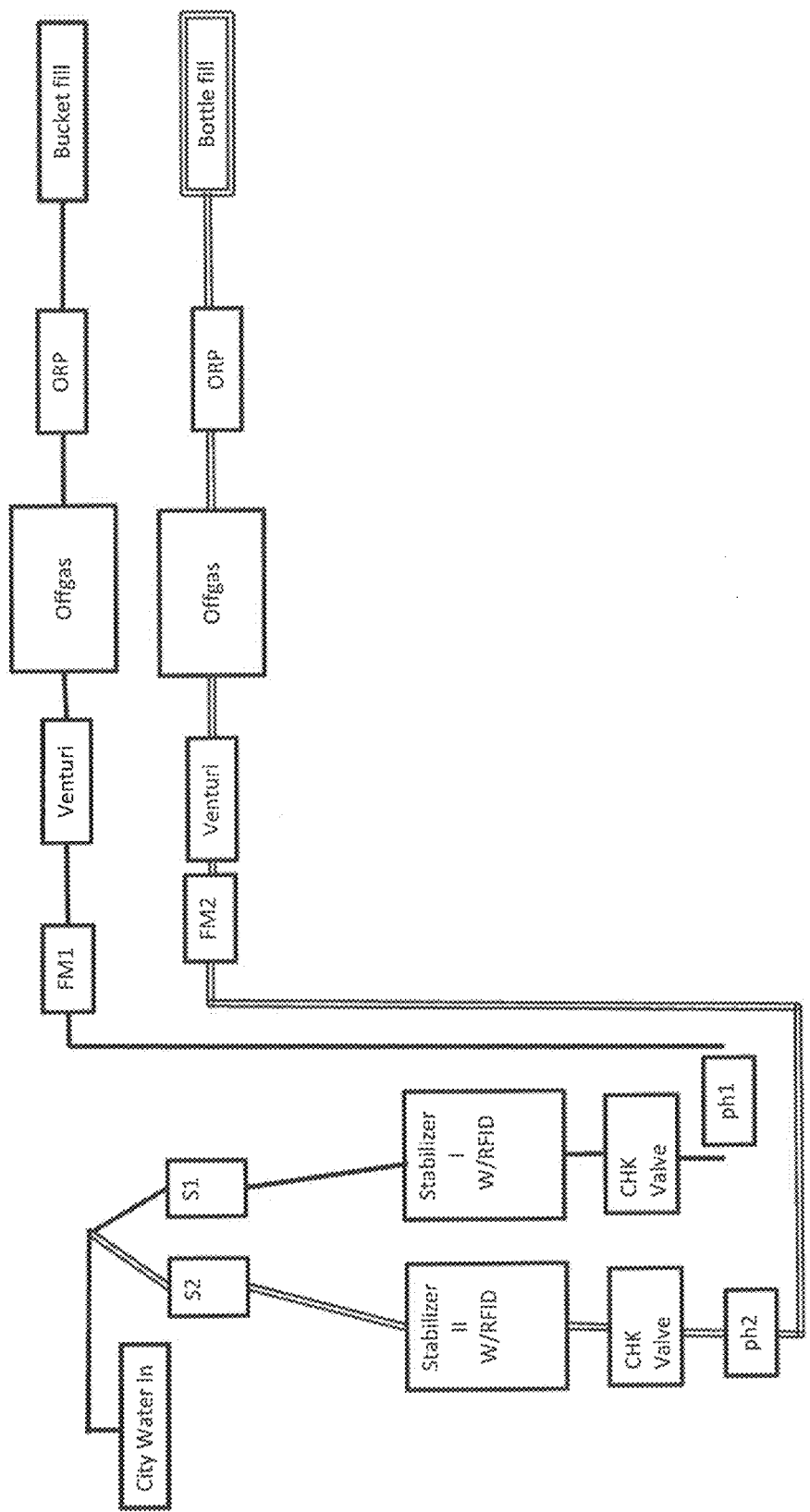
FIG. 11 is a block diagram of a system for providing ozonated liquid including a secondary flow path according to another embodiment of the present application showing water flow relationships between selected system components.

FIG. 11 is a block diagram of a system for providing ozonated liquid, such as a water treatment system, including a secondary flow path according to an embodiment of the present application showing liquid flow relationships between selected system components. Electrical connections and other data communication relationships are omitted from FIG. 11, so as not to obscure the features relating to liquid flow relationships. In FIG. 11, the secondary flow path is shown using double lines, while the primary flow path is shown using single solid lines.

In an example embodiment, the primary flow path generally has a ½ inch diameter flow path and a venturi with a narrow waist section having a diameter of about 0.18"; the secondary flow path generally has a ¼ inch diameter flow path and a venturi with a narrow waist section having a diameter of about 0.06". In some examples, the diameter of the narrow waist section of a venturi is from 20% to 40% of the diameter of the tubing in the rest of the flow path.

In an embodiment, the ozonation system of FIG. 11 comprises a secondary tank-less ozonation flow path having a secondary liquid outlet. The primary flow path has a first venturi with a narrow waist section, and the secondary flow path has a second venturi with a narrow waist section. The venturis are in fluid communication with the liquid inlet and mix an accepted liquid with gaseous ozone to produce ozonated liquids. The diameter of the waist section in the second venturi is smaller than the diameter of the narrow waist section of the first venturi. The secondary flow path produces an ozonated liquid having a higher ozone concentration than the ozonated liquid produced by the primary flow path.

In an embodiment, the secondary flow path output provides sanitizing liquid at a second flow rate which is lower than a first flow rate of the primary flow path. The lower flow rate of the secondary flow path facilitates the controlled filling of small volume containers such as spray bottles, while the higher flow rate of the primary flow path facilitates the efficient filling of large volume containers such as buckets. In an example embodiment, the low flow-rate flow path has a flow rate that is from about 10% to about 35% of the flow rate of the high flow-rate flow path. In example embodiment, the low flow rate may be about 1-2 gallons per minute, and the high flow rate may be about 6-8 gallons/minute. In an particular embodiment, the low flow-rate is about 1 gallon per minute, and the high flow-rate is about 5 gallons per minute.

As shown in the example embodiment of FIG. 11, each of the primary and secondary flow paths includes its own solenoid, ozone stabilizer, check valve, pH meter, flow meter, venturi, off-gas unit, and ORP sensor. Each of these components in the secondary flow path has properties suitable to produce ozonated liquid at the flow rate established by the size of the liquid-gas mixer in the secondary flow path. Similarly, each of the components in the primary flow path has properties suitable to produce ozonated liquid at the flow rate established by the size of the liquid-gas mixer in the primary flow path.

In an example embodiment, the primary flow path includes a first ozone stabilizer to extend the half-life of the dissolved ozone and the secondary flow path includes a second ozone stabilizer to extend the half-life of the dissolved ozone. In an example embodiment, the first and second ozone stabilizers have different properties, for example with respect to ozone half-life, treatment volume before ozone stabilizer regeneration or replacement, or both.

In another example embodiment, the first and second ozone stabilizers have similar properties, for example with respect to ozone half-life, treatment volume before ozone stabilizer regeneration or replacement, or both.

In one example, a first ozone stabilizer to extend the half-life of the dissolved ozone is provided in the primary flow path and a second ozone stabilizer to extend the half-life of the dissolved ozone is provided in the secondary flow path. In an example embodiment the first ozone stabilizer is a Series 1 resin stabilizer and the second ozone stabilizer is a Series 2 resin stabilizer. The Series 1 resin stabilizer may not need to be regenerated as often as a Series 2 resin stabilizer, but may not extend the half-life of the stabilized ozone as much as the Series 2 resin stabilizer. Since the Series 2 resin stabilizer (which provides a longer half-life of ozone when compared to the ozone half-life of the liquid treated by the Series 1 resin stabilizer) depletes faster than the Series 1 resin stabilizer, the Series 2 resin stabilizer provides less liquid throughput before needing replacement. Since less liquid is output per application for bottle filling than bucket filling, and since a longer half-life is desirable for bottle-based applications, the Series 2 resin stabilizer is a good choice for the secondary flow path.

In another example, a Series 1 resin stabilizer is provided in both the primary and secondary flow paths. In a further example embodiment, a Series 2 resin stabilizer is provided in both the primary and secondary flow paths.

The first and second ozone stabilizers may be user-replaceable such that a user can change the first and second ozone stabilizers, and thereby change the ozone half-life properties and other properties of the liquid produced in the respective flow path, based on desired applications for use.

In the embodiment of FIG. 11, a first pH meter and a first flow meter are provided in the primary flow path, and a second pH meter and a second flow meter are provided in the secondary flow path. The pH meters may be used to check the pH coming out of the respective ozone stabilizer, to assist in determining remaining ozone stabilizing capacity. The pH meters may be used to indicate whether the ozone stabilizer should be replaced or regenerated. The flow meters count actual water usage, and also assist in determining remaining ozone stabilizing capacity, along with the pH meters.

With respect to the ORP sensors, ORP is a measure of oxidizing capacity. Since the secondary flow path has a higher ozone concentration than the primary flow path, a higher ORP level would be expected at the secondary flow path ORP sensor when compared to the ORP level at the primary flow path ORP sensor.

It should be understood that after about 1200 mV, ORP levels do not increase as the amount of dissolved ozone increases. Accordingly, two liquids may have different ozone concentrations but the similar ORP levels. For example, the liquid produced by the primary flow path may have 1.5 ppm ozone and an ORP of about 1100 mV, while the liquid produced by the secondary flow path may have 5 ppm ozone and an ORP of about 1200 mV. A liquid having a greater concentration of dissolved ozone will take longer to revert to a substantially non-oxidizing liquid than a liquid with a lower concentration of dissolved ozone.

Figure 12:
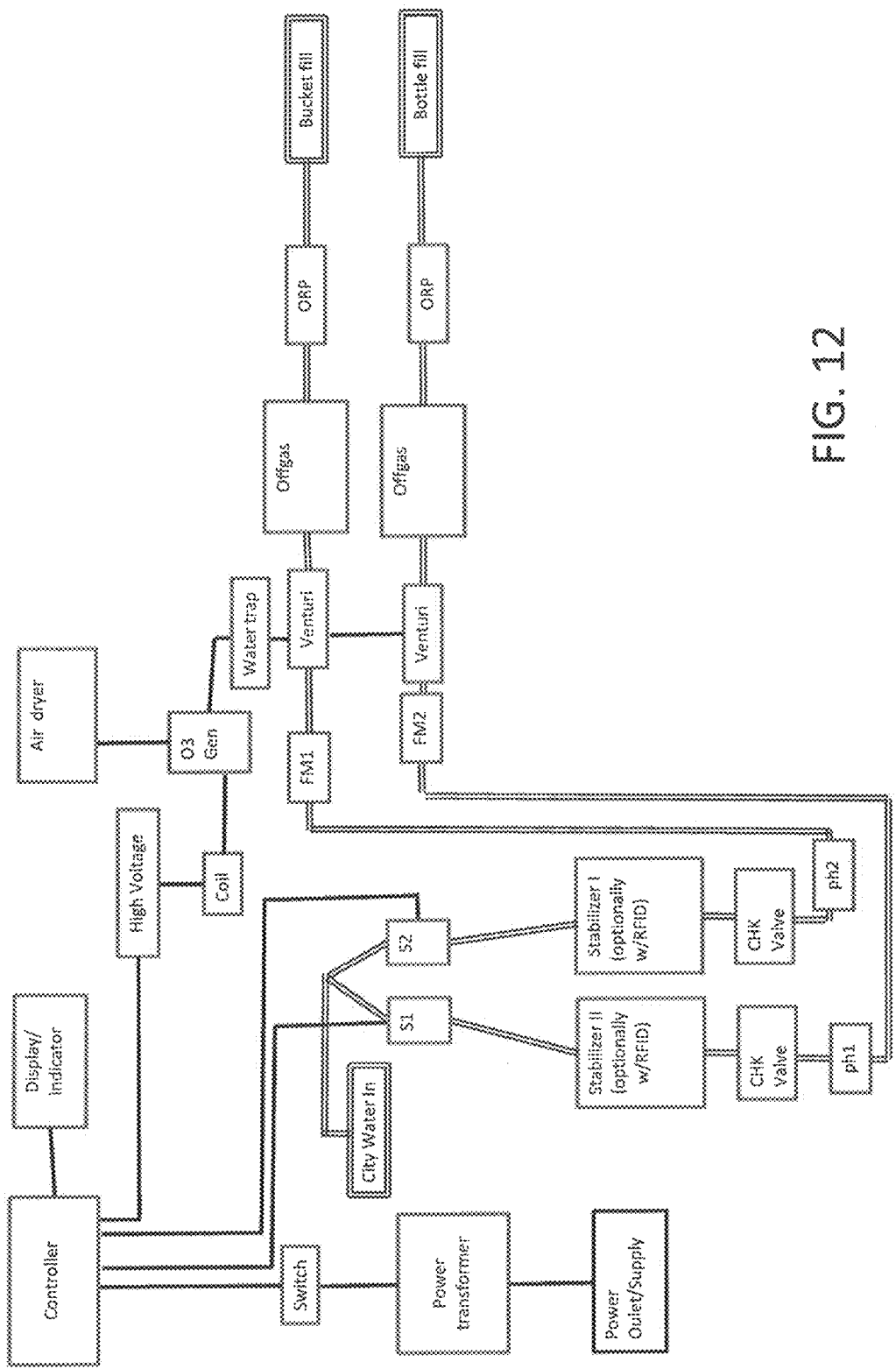
FIG. 12 is a block diagram of the system of FIG. 11 showing both liquid flow relationships and electrical connection relationships between selected system components.

FIG. 12 is a block diagram of the system of FIG. 11 showing both liquid flow relationships and electrical connection relationships between selected system components. The electrical connection relationships are shown in single bold lines, and the liquid flow relationships are shown in double lines. According to an embodiment of the present application, as shown in FIG. 12, a controller, such as a programmable logic controller (PLC), is in communication with first and second solenoids in the primary and secondary flow paths, respectively. The controller is also in communication with an ozone generator (O3 gen) which feeds the liquid-gas mixers, for example venturis, to ozonate the liquid in the respective flow paths to produce an ozonated for cleaning, sanitizing, disinfecting or sterilizing.

In an embodiment, the system further comprises an indicator or display, in communication with the controller. The indicator or display is configured to provide an output in response to data at the controller. The data at the controller can be received from one or more elements of the system, as will be described in further detail in relation to FIG. 13. In an embodiment including an indicator, the indicator comprises a light emitting diode (LED). In another embodiment including a display, the display comprises a display panel such as a liquid crystal display (LCD), which may include a touch screen. In an example embodiment, the controller and the display are configured to display an output in response to data at the controller, which can be stored in a memory at the controller after receipt from a system element. In another example embodiment, the controller and the display are configured to display instructional information relating to the system. The instructional information, which can include text, images, videos, or a combination thereof, can be stored locally at the system, or delivered to the system via the controller over a suitable communications network.

Collecting Component and Usage Data:

Data regarding the performance of a liquid ozonation system, such as a water treatment system, can be useful in determining whether the system is performing according to design or intent, and whether any system components are due for replacement. Manual collection of such data, or manual inspection of components to make such determination, is time consuming and prone to human error. According to embodiments of the present application, the controller is advantageously used to collect or receive data from system components to better manage the performance of the system. Such embodiments take advantage of the electronics already present in the system by way of the controller as described in relation to FIG. 12 and in other embodiments described above. Other known liquid ozonation systems, which lack any on-board electronics or the type of electronics suitable for such purposes, are not able to provide such advantageous features.

Figure 13:
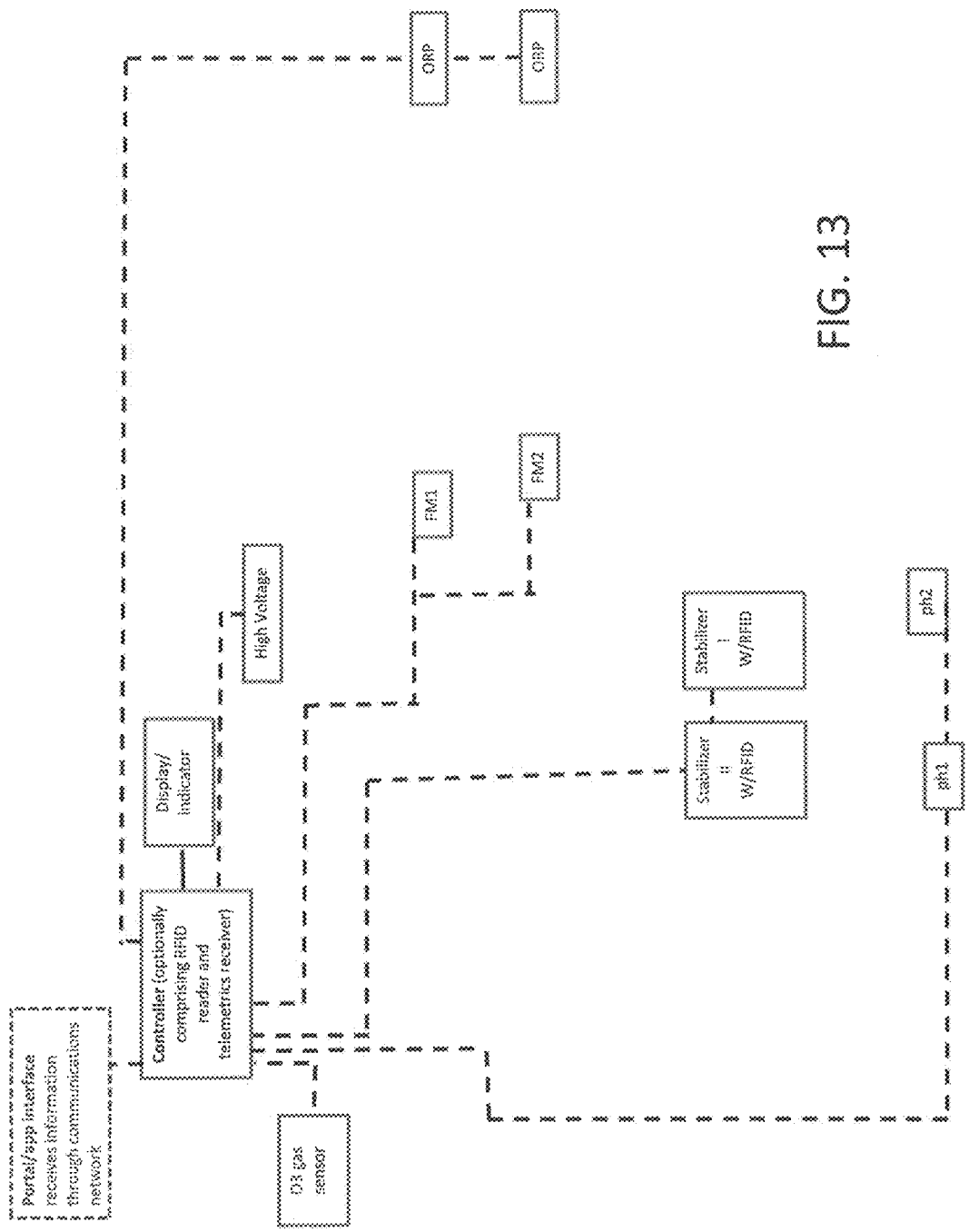
FIG. 13 is a block diagram of a system for providing ozonated liquid according to another embodiment of the present application showing telemetric data communication relationships between selected system components.

FIG. 13 is a block diagram of the system of FIG. 12 but only showing telemetric data communication relationships between selected system components. According to an embodiment of the present application, as shown in FIG. 13, the controller includes a telemetric receiver configured to receive telemetric data from one or more telemetric sensors in the water treatment system.

Telemetric data can be communicated from a telemetric sensor to a telemetric receiver by any suitable communication means, such as a communication network. The communication network can include a wireless network such as a cellular, Wi-Fi, Bluetooth or other network, which may be established on an ad-hoc basis. The communication network can also include a wired network such as an optical or fiber connection, or copper connection, either alone or in combination with a wireless network. In an example embodiment, telemetric data is communicated over a cellular network, for example using short message service (SMS) or other text messaging services.

In the previously-described embodiments of FIGS. 7-10, the removable filter cartridge includes a usage counter configured to count usage based on a chronological counter. In the embodiment of FIG. 13, rather than rely on counters or timers, a telemetric sensor obtains and transmits telemetric flow path data based on a count of actual usage by volume, rather than estimated usage based on active time. For example, the telemetric flow path data can include flow rate data from a flow meter, or a measured pH level from a pH meter, or both. Telemetric data relating to time of use of individual system components can also be provided to determine capacity, or count usage, or both.

In an embodiment, the telemetric data is sent from the telemetric sensor(s) to the telemetric receiver at the controller. In an example embodiment, the telemetric data is also sent to a receiver associated with a master database, either directly by the telemetric sensor(s) or indirectly via the controller. Receipt of the telemetric data at the master database enables the owner of the master database, such as the manufacturer or reseller of the liquid ozonation system, to gather and analyze telemetric data from each system over time, to observe performance of the system at various stages of use, system age, or system installation conditions. In an embodiment, the telemetric data from a plurality of liquid ozonation systems is aggregated in the master database and analyzed to track faults, inform quality assurance programs, or provide the manufacturer/reseller with data that can be valuable in determining priorities with respect to research and development or marketing initiatives.

In an example embodiment, the telemetric data can include one or more of the following: ozone stabilizer status; ozone stabilizer serial number; work status of the component; ozone stabilizer cycles remaining; number of times an ozone stabilizer has been cycled; ozone stabilizer gallons remaining; system error code send message; errors; warnings; information items; new ozone stabilizer installed indication; monthly usage data; high capacity unit (HCU) serial number; ORP value/mV reading from ORP sensor; measured non-timing or non-counter data; or any other measured value or amount detected or determined by a telemetric sensor at a component of a liquid ozonation system.

In an example embodiment, the telemetric data can trigger a replacement condition indicating that a component, for example the ozone stabilizer, is due for replacement. In an example embodiment, the replacement indicator triggers the transmission of a replacement notification, which notifies a component provider (such as the manufacturer or reseller of the system) to ship a replacement ozone stabilizer to the customer, for example via overnight courier. The replacement notification can comprise a message, such as an email message, text message, or any other similar message. The replacement notification can include a serial number or model number of the component to be replaced. This advantageous approach reduces the need for customers to maintain an on-site inventory of ozone stabilizers, and provides the manufacturer/reseller with valuable information regarding ozone stabilizer usage for individual systems, and enables improved customer service. In addition to providing data for individual systems, aggregate data for ozone stabilizers employed in systems at different locations can be used to perform analytics such as identifying usage trends, identifying triggers suggesting incorrect use, etc.

In another example embodiment, the telemetric data can be provided to the manufacturer, reseller, or both, and used for invoicing, maintenance or warranty purposes.

In another example embodiment, the telemetric data communication comprises two-way communication. For example, the controller can be configured to receive configuration or programming data to enable remote programming, diagnostics or updating of firmware on the controller. In an example embodiment, a telemetric sensor provided on a system component which is not the controller, such as the ozone stabilizer, also comprises a telemetric receiver. As such, a system component that is not the controller can also be updated with respect to remote programming, diagnostics or updating of firmware.

While the transmission and reception of telemetric data has been described in relation to FIG. 13, in another embodiment such features are provided in any liquid ozonation system or water treatment system, regardless of whether the system includes more than one flow path, or includes some or all of the other particular features such as the number or presence of ozone stabilizers, valves, etc.

Compatibility:

In the previously-described embodiment of FIG. 7, the removable filter cartridge included a usage counter and a compatibility identifier, for use by a compatibility manager to compare with a compatibility identifier of an ozonation device.

In an example embodiment, the controller of FIG. 13 further comprises a radio-frequency identification (RFID) reader configured to obtain data from one or more RFID transponders, or RFID tags in the water treatment system. The RFID tags can be used as a compatibility identifier, to not only determine compatibility of an ozone stabilizer with a liquid ozonation system, or water treatment system, but also to authenticate an ozone stabilizer that is authorized for use with a particular liquid ozonation system. For example, the system can shut down if information read from the RFID tag on the ozone stabilizer does not match an expected value.

In an example embodiment in relation to FIG. 13, an RFID tag provided on one of the ozone stabilizers is a passive label that is free of a battery or other power source which can be printed inexpensively and applied to the ozone stabilizer housing. In an example embodiment, different types or series of ozone stabilizer can be identified by their serial number with respect to the number of cycles after which the ozone stabilizer should be shut down. This can be useful in situations where counting up, or counting down, the number of cycles is required. In an example embodiment, in the case of a passive RFID tag, the total number of cycles can be read by the RFID reader and stored at the controller, and data regarding usage can be used to update the cycle value at the controller until it reaches a predetermined value, such as zero, at which point a notification is generated indicating a replacement condition for the ozone stabilizer.

In another example embodiment in relation to FIG. 13, an RFID tag provided on one of the ozone stabilizers is a rewritable RFID tag, or semi-passive RFID tag. In an example embodiment, the tag has a unique antenna for security, and a shift register to count the cycles to a defined number. In an example embodiment, 1 cycle is 40 seconds, and there are 2 series of ozone stabilizers, one with a 900 cycle lifespan and another with a 450 cycle lifespan. The cycles are counted down, and once the register reaches zero, an indicator (signal LED, or other indication on an LCD display) is activated and the system shuts down.

The controller, in response to receipt of RFID data from an RFID tag and/or telemetric data based on certain indicators, can send a signal to rewrite a value of the RFID tag on the ozone stabilizer until the value reaches a threshold replacement value. In an embodiment, reaching the threshold replacement value triggers generation of a replacement indicator, such as described above with respect to the telemetry data. In an example embodiment, the controller sends a signal based on received indicator parameters and rewrites the RFID tag on the ozone stabilizer. This handshaking continues until a preset value is read by the controller, at which time the unit shuts down and an ozone stabilizer indicator is activated/lit, or a replacement notification is sent, or both. In an example embodiment, telemetry communication, as described earlier, can be used in conjunction with the data from the RFID tag and reader to signal a replacement condition or generate a replacement notification for the ozone stabilizer.

In an example embodiment, a portal or application, also known as an app, is provided as an interface through which telemetric data can be relayed via a communications network. In an embodiment, a processor and a memory are provided on a user device, the memory storing statements and instructions for execution by the processor execute the application, for example to receive and display telemetric data, RFID data, or both, received from the controller. The application, which can be a software application, can comprise a graphical user interface for providing the telemetric data for display to a user. In an example embodiment, the application is in communication with the controller to receive and display telemetric data, or RFID data, or both, gathered from the system components.

Figure 14:
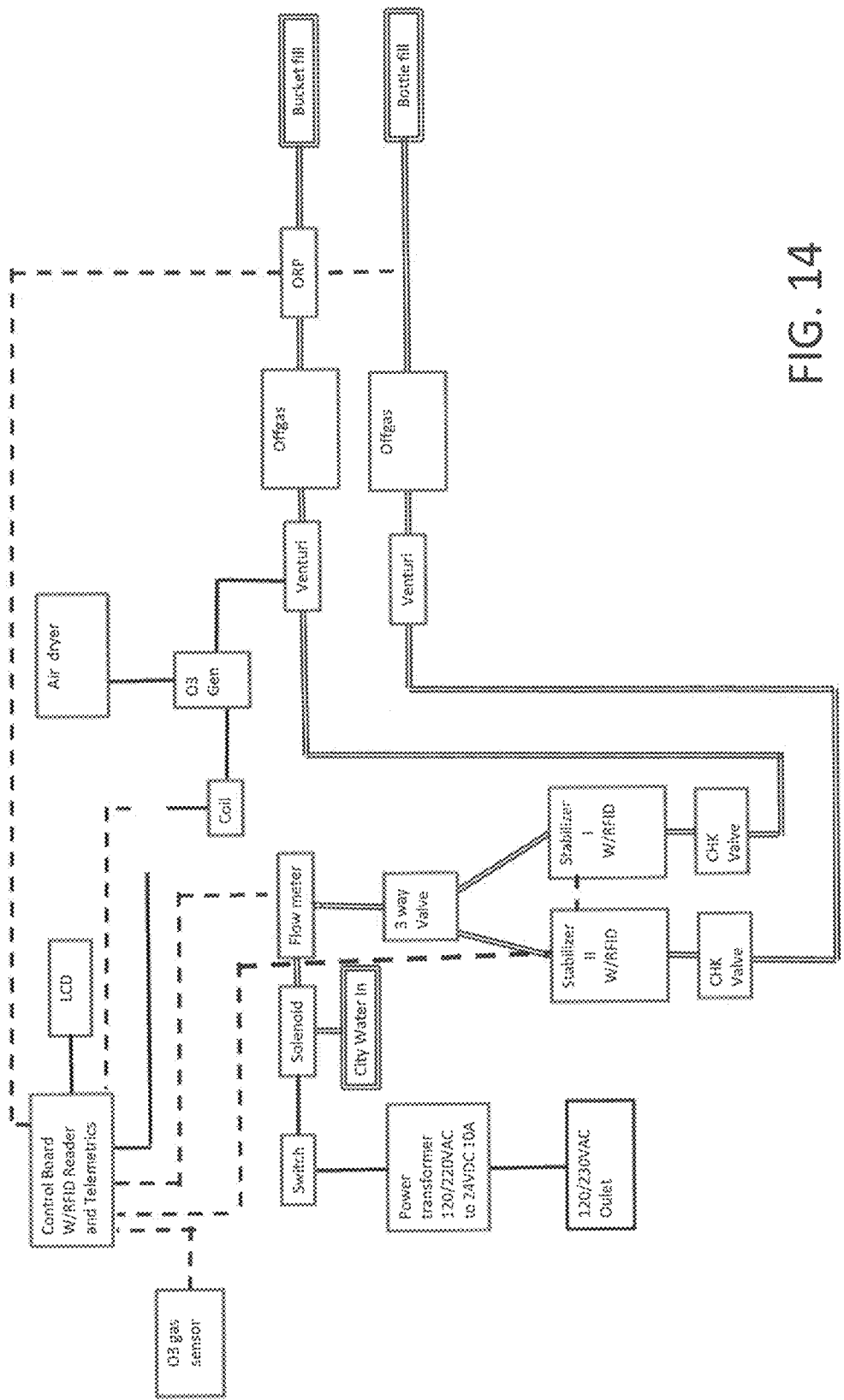
FIG. 14 is a block diagram of a system for providing ozonated liquid according to another embodiment of the present application showing liquid flow relationships, electrical connection relationships and telemetric data communication relationships between selected system components.

FIG. 14 is a block diagram of a system for providing ozonated liquid according to another embodiment of the present application showing liquid flow relationships, electrical connection relationships and telemetric data communication relationships between selected system components. While the embodiments in FIGS. 11-13 show a system including a separate solenoid for each flow path, the embodiment of FIG. 14 shows a single solenoid and flow meter provided between the city water in and a 3 way valve that selectively provides water flow to the first and second oxygen stabilizers. One or both of the primary and secondary flow paths can optionally comprise a flow meter, or a pH meter, or both.

Figure 15:
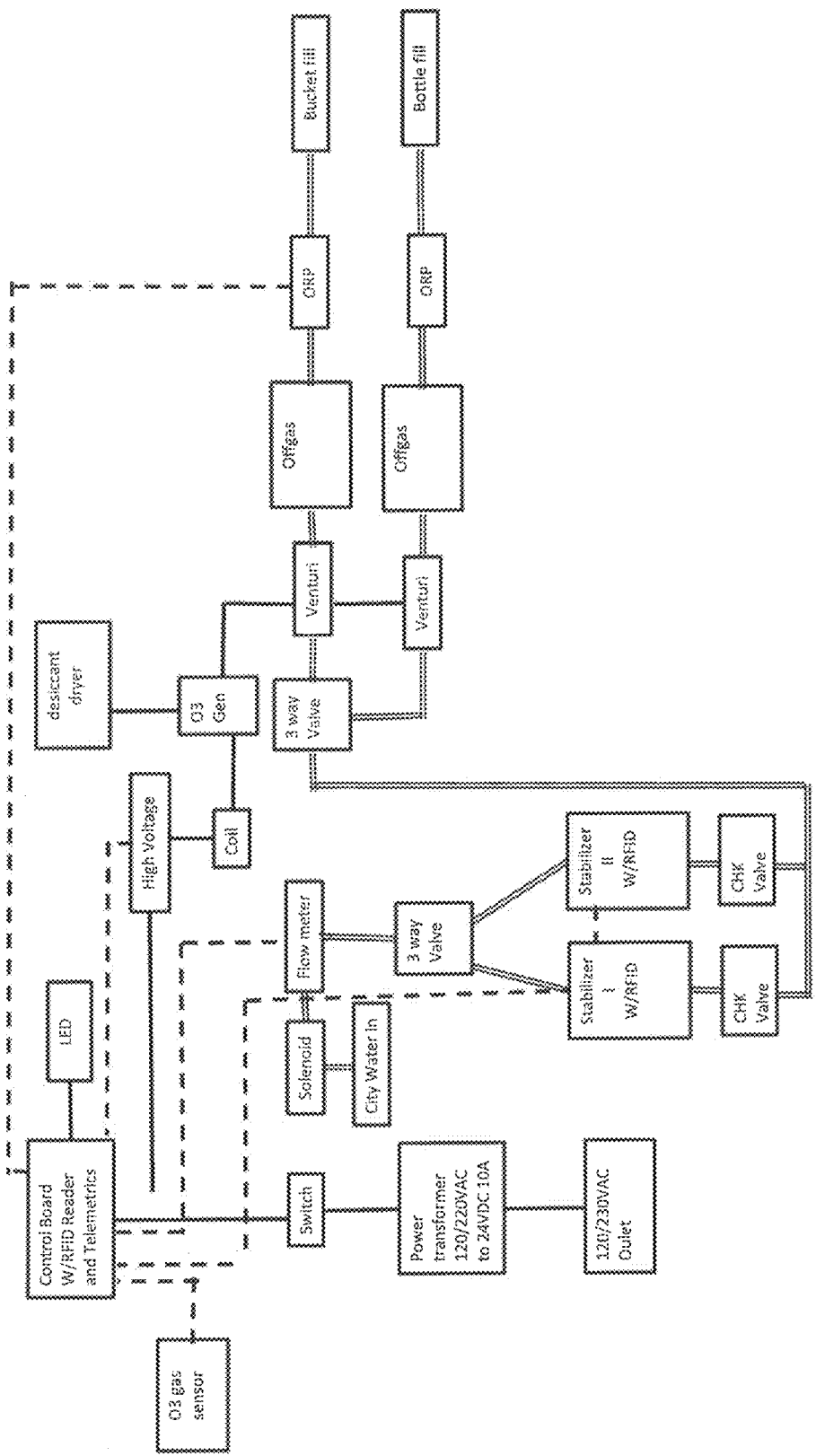
FIG. 15 is a block diagram of a system for providing ozonated liquid according to a further embodiment of the present application showing liquid flow relationships, electrical connection relationships and telemetric data communication relationships between selected system components.

FIG. 15 is a block diagram of a system for providing ozonated liquid according to a further embodiment of the present application showing liquid flow relationships, electrical connection relationships and telemetric data communication relationships between selected system components. While the embodiment of FIG. 14 shows each check valve in the primary and secondary flow paths connected directly to their respective liquid-gas mixer, or venturi, the embodiment of FIG. 15 provides the check valve outputs as an input to a 3 way valve that selectively provides water flow to the two liquid-gas mixers, or venturis. One or both of the primary and secondary flow paths can optionally comprise a flow meter, or a pH meter, or both.

In the preceding description, for purposes of explanation, numerous details are set forth in order to provide a thorough understanding of the embodiments of the application. However, it will be apparent to one skilled in the art that these specific details are not required in order to practice the application.

Embodiments described herein can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment described herein. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments of the application are intended to be examples only. Alterations, modifications and variations can be effected to the particular embodiments by those of skill in the art without departing from the scope of the application, which is defined solely by the claims appended hereto.

The invention claimed is:

1. A system for providing a degassed ozonated liquid comprising dissolved ozone gas, the system comprising:
   a primary tank-less ozonation flow path having a liquid inlet and a liquid outlet, the primary ozonation flow path further comprising:
   a liquid-gas mixer, in fluid communication with the liquid inlet, to mix an accepted liquid with gaseous ozone to produce an ozonated liquid which comprises bubbles of undissolved ozone gas; and
   a gas-liquid separator, in fluid communication with the liquid-gas mixer, to separate the ozonated liquid into the degassed ozonated liquid and separated gaseous ozone, the gas-liquid separator comprising:
   a tubular member;
   a gaseous liquid inlet for entry of the ozonated liquid;
   a gas outlet arranged to vent the separated gaseous ozone out of the gas-liquid separator;
   a liquid outlet for egress of the degassed ozonated liquid from the gas-liquid separator; and
   a separating mixer secured to the tubular member and arranged to direct the flow of the degassed ozonated liquid towards the liquid outlet and to direct the separated gaseous ozone away from the liquid outlet;
   the liquid inlet arranged to continuously accept a substantially unozonated liquid into the ozonation flow path at a desired flow rate;
   the liquid outlet arranged to dispense the degassed ozonated liquid out of the system, the degassed ozonated liquid having an oxidation-reduction potential of at least 450 mV due solely to ozone dissolved in the liquid, the liquid outlet being in fluid communication with the liquid inlet and arranged to dispense the degassed ozonated liquid out of the system at the desired flow rate;
   the primary tank-less ozonation flow path adapted to ozonate the accepted liquid, producing the ozonated liquid to be dispensed out of the primary ozonation flow path, the accepted liquid having a fluid residence time in the primary ozonation flow path of less than 5 minutes prior to dispensing as the ozonated liquid; and
   a secondary tank-less ozonation flow path having a secondary liquid inlet and a secondary liquid outlet, the secondary flow path comprising a second liquid-gas mixer that is smaller than the liquid-gas mixer of the primary tank-less ozonation flow path, in fluid communication with the second liquid inlet, to mix an accepted liquid with gaseous ozone to produce an ozonated liquid having a higher ozone concentration than the ozonated liquid output by the primary flow path.

2. The system according to claim 1, wherein:
   the first and second liquid-gas mixers are venturi mixers, and the first venturi has a narrow waist section whose diameter is larger than the diameter of the narrow waist section of the second venturi.

3. The system according to claim 1, wherein the ozonated liquid provided at the output of the secondary flow path has an ozone concentration of about 6 ppm, and the ozonated liquid provided at the output of the primary flow path has an ozone concentration of about 1.5 ppm.

4. The system according to claim 1, wherein the system further comprises an oxygen generator, and wherein the ozonated liquid provided at the output of the secondary flow path has an ozone concentration of about 10 ppm, and the ozonated liquid provided at the output of the primary flow path has an ozone concentration of about 5 ppm.

5. The system according to claim 1, wherein the primary flow path comprises a high flow-rate flow path configured to output the ozonated liquid at a first flow rate, and the secondary flow path comprises a low flow-rate flow path configured to output the ozonated liquid at a second flow rate lower than the first flow rate.

6. The system according to claim 5 wherein the second flow rate is about 10% to about 35% of the first flow rate.

7. The system according to claim 5 wherein the first flow rate is about 5 gallons per minute, and the second flow rate is about 1 gallon per minute.

8. The system according to claim 1 wherein: the primary flow path has a ½ inch diameter and a venturi with a narrow waist section having a diameter of about 0.18 inch; and the secondary flow path has a ¼ inch diameter and a venturi with a narrow waist section having a diameter of about 0.06 inch.

9. The system according to claim 1, wherein each of the primary and secondary flow paths includes its own solenoid, ozone stabilizer, check valve, pH meter, flow meter, venturi, off-gas unit, and ORP sensor, each of these components having properties suitable to produce ozonated water at the flow rates of the liquid-gas mixers.

10. The system according to claim 1, further comprising a first ozone stabilizer provided in the primary flow path, and a second ozone stabilizer provided in the secondary flow path.

11. The system according to claim 10, wherein the first ozone stabilizer includes a first resin stabilizer and the second ozone stabilizer includes a second resin stabilizer, wherein the first resin stabilizer produces ozonated water having a shorter half-life than the ozonated water produced by the second resin stabilizer, and wherein the first resin stabilizer requires regeneration or replacement after treatment of a greater volume of liquid than the second resin stabilizer.

12. The system according to claim 1, further comprising:
   at least one telemetric sensor configured to obtain telemetric data associated with a system component; and
   a controller, in telemetric data communication with the at least one telemetric sensor, including a telemetric receiver configured to receive the telemetric data from the at least one telemetric sensor.

13. The system according to claim 12, wherein the controller, in response to receipt telemetric data triggering a replacement condition indicating that a system component is due for replacement, triggers the transmission of a component replacement notification.

14. The system according to claim 12, wherein the controller, in response to telemetric data satisfying an ozone stabilizer replacement condition, triggers the transmission of an ozone stabilizer replacement notification.

15. The system according to claim 12, wherein the telemetric data communication comprises two-way communication, and the controller is configured to receive and execute configuration actions based on received telemetric data.

16. The system according to claim 1, further comprising:
   at least one radio-frequency identification (RFID) tag associated with a system component; and
   a controller, in data communication with the at least one RFID tag, including an RFID reader configured to obtain system component data stored in the RFID tag.

17. The system according to claim 16, wherein the at least one RFID tag comprises a rewritable RFID tag, and wherein the controller is configured to send a signal to modify the system component data stored on the RFID tag in response to received indicator parameters read by the RFID reader.

* * * * *